(12) United States Patent
Morris et al.

(10) Patent No.: US 7,841,608 B2
(45) Date of Patent: Nov. 30, 2010

(54) PNEUMATIC PROPORTIONING SYSTEM FOR VEHICLE AIR SPRINGS

(75) Inventors: Brian R. Morris, Uniontown, OH (US); Jesse W. Cervantez, Navarre, OH (US); Santo Padula, Medina, OH (US); Michael D. Oyster, Stow, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 166 days.

(21) Appl. No.: 12/180,165

(22) Filed: Jul. 25, 2008

(65) Prior Publication Data

US 2009/0033055 A1 Feb. 5, 2009

Related U.S. Application Data

(60) Provisional application No. 60/952,951, filed on Jul. 31, 2007.

(51) Int. Cl.
B60G 11/26 (2006.01)

(52) U.S. Cl. .................. 280/124.16; 280/124.157; 280/6.157; 280/5.514

(58) Field of Classification Search ............ 280/124.16, 280/124.157, 124.161, 6.157, 5.514
See application file for complete search history.

(56) References Cited

U.S. PATENT DOCUMENTS

| | | | | |
|---|---|---|---|---|
| 2,882,068 A * | 4/1959 | Faiver | ...................... | 280/5.503 |
| 3,442,502 A | 5/1969 | Fischer et al. | | |
| 4,505,405 A * | 3/1985 | Kelly et al. | .................. | 222/135 |
| 4,993,729 A * | 2/1991 | Payne | ........................ | 280/81.1 |
| 5,042,834 A * | 8/1991 | Yonekawa et al. | ........ | 280/5.514 |
| 5,069,302 A * | 12/1991 | Kageyama | .................. | 180/197 |
| 5,160,161 A * | 11/1992 | Tsukamoto et al. | ...... | 280/5.501 |
| 5,176,399 A * | 1/1993 | Takehara et al. | .......... | 280/5.507 |
| 5,273,308 A * | 12/1993 | Griffiths | ................... | 280/6.151 |
| 5,452,919 A * | 9/1995 | Hoyle et al. | .............. | 280/5.514 |
| 5,466,007 A * | 11/1995 | Smith | ....................... | 280/6.157 |
| 5,472,227 A * | 12/1995 | Schonfeld et al. | ........... | 280/683 |
| 6,061,615 A * | 5/2000 | Karthaeuser | .................. | 701/37 |
| 6,240,339 B1 | 5/2001 | von Mayenburg et al. | | |
| 6,264,213 B1 * | 7/2001 | Kutscher | .................. | 280/5.514 |
| 6,308,793 B1 * | 10/2001 | Eberling | ................... | 180/24.02 |
| 6,412,789 B1 | 7/2002 | Pierce et al. | | |

(Continued)

FOREIGN PATENT DOCUMENTS

DE 4222922 A1 7/1993

(Continued)

*Primary Examiner*—Paul N Dickson
*Assistant Examiner*—Nicole Verley
(74) *Attorney, Agent, or Firm*—Krugliak, Wilkins, Griffiths & Dougherty Co., L.P.A.; David P. Dureska; Brent L. Moore

(57) ABSTRACT

A pneumatic proportioning system for heavy-duty vehicle air springs includes an air supply, a height control valve and a solenoid valve in fluid communication with one another and with the air springs of at least one axle/suspension systems of a heavy-duty vehicle. A proportioning means is in fluid communication with the air supply, with the height control valve, with the solenoid valve, with the air springs and with atmosphere and operates to proportion loads between the air springs of the axle/suspension systems when the solenoid valve is activated during operation of the heavy-duty vehicle.

4 Claims, 10 Drawing Sheets

U.S. PATENT DOCUMENTS

| | | |
|---|---|---|
| 6,523,625 B2 * | 2/2003 | Eberling et al. .......... 180/24.02 |
| 6,572,124 B2 * | 6/2003 | Mlsna et al. ................ 280/86.5 |
| 7,261,304 B2 * | 8/2007 | Trudeau et al. .......... 280/6.153 |
| 7,396,029 B2 * | 7/2008 | Hecker et al. .......... 280/124.16 |
| 7,552,932 B2 * | 6/2009 | Matern et al. .......... 280/124.16 |
| 7,661,681 B1 * | 2/2010 | Zork et al. ............... 280/5.514 |
| 7,694,984 B2 * | 4/2010 | Germain .............. 280/124.161 |
| 2002/0066605 A1 | 6/2002 | McClelland et al. |
| 2002/0074746 A1 | 6/2002 | Eberling et al. |
| 2003/0132594 A1 * | 7/2003 | Den Hartog .......... 280/124.16 |
| 2006/0125201 A1 * | 6/2006 | Shore .................... 280/124.16 |
| 2007/0040344 A1 * | 2/2007 | Stiller ................. 280/124.157 |
| 2007/0158920 A1 * | 7/2007 | Delaney ................. 280/5.514 |
| 2007/0200304 A1 * | 8/2007 | Brookes et al. .......... 280/5.514 |
| 2008/0054576 A1 * | 3/2008 | Ilias et al. ................ 280/5.514 |
| 2008/0246234 A1 * | 10/2008 | Krauss .................... 280/5.514 |
| 2009/0079146 A1 * | 3/2009 | Stahl et al. ................ 280/6.159 |
| 2009/0079154 A1 * | 3/2009 | Sheehan et al. ........ 280/124.16 |

FOREIGN PATENT DOCUMENTS

| | | |
|---|---|---|
| EP | 0411352 A1 | 2/1991 |
| EP | 1571015 A2 | 9/2005 |
| EP | 1647425 A2 | 4/2006 |
| EP | 1852284 A1 | 11/2007 |
| JP | 09109645 A | 4/1997 |
| WO | 2007050014 A1 | 5/2007 |

* cited by examiner

FROM AIR RESERVOIR

PNEUMATIC PROPORTIONING SYSTEM FOR VEHICLE AIR SPRINGS

This application claims the benefit of U.S. Provisional Application No. 60/952,951, filed on Jul. 31, 2007.

BACKGROUND OF THE INVENTION

1. Field of the Invention

The invention relates generally to the art of air-ride axle/suspension systems for heavy-duty vehicles, such as tractor-trailers or semi-trailers, which cushion the ride and stabilize the vehicle during operation. More specifically, the invention relates to control of the air springs of an air-ride axle/suspension system, and in particular to a pneumatic proportioning system which regulates and proportions air among air springs of an air-ride axle/suspension system.

2. Background Art

Heavy-duty vehicles, such as tractor-trailers or semi-trailers, typically include two or more leading or trailing arm suspension assemblies that connect the wheel-bearing axles of the vehicle to the frame of the vehicle. Early suspension designs included heavy leaf spring suspensions which resulted in a relatively rough ride to the cargo and/or passengers carried by the vehicle, and did not allow loads to equalize among the axles in all situations, thus creating the need for an axle/suspension system with softer ride characteristics and more efficient equalization characteristics. The subsequent development of air-ride axle/suspension systems provided greater load equalization among multiple axles for semi-trailers as well as improved ride quality for individual axles.

As a result, heavy-duty vehicles that transport freight often include leading or trailing arm air-ride axle/suspension systems, which use air springs to cushion the ride of the vehicle. Pneumatic control of these air springs is an important feature of air-ride axle/suspension systems.

More particularly, it is important for a cushioned vehicle ride, and for optimum axle/suspension system performance and longevity, to attempt to maintain a consistent, predetermined distance between the vehicle frame and the travel surface. This predetermined distance is known in the art as the design ride height of the vehicle. The operating conditions of the vehicle must be considered in order to establish the design ride height of a vehicle. That is, when a heavy-duty vehicle executes certain maneuvers, such as making a hard turn or traveling over rough terrain, the forces imposed on the axle/suspension system by such maneuvers cause the axle/suspension system to articulate, or pivot and/or flex beneath the vehicle frame which the system supports. Typically, an axle/suspension system is designed so that the anticipated range of articulation, pivoting and/or flexing occurs about a nominal predetermined position, and that nominal position is set as the design ride height of the vehicle.

After a heavy-duty vehicle is loaded with freight, or after freight is unloaded from the vehicle, the air springs of the axle/suspension system are adjusted to ensure that the vehicle is at design ride height. The adjustment of the air springs of the axle/suspension system is typically accomplished by a height control valve or leveling valve which is in fluid communication with an air source and with the air springs. When the vehicle is loaded with freight and the air springs of an axle/suspension system are compressed causing the vehicle frame to be positioned below design ride height or closer to the travel surface, compressed air is supplied to the air springs increasing the air pressure inside the air spring, thereby increasing air spring load. The increasing air spring load inflates/extends the air springs in turn causing the axle/suspension system to raise the vehicle frame to the design ride height. Conversely, when the vehicle is unloaded and the air springs of the axle/suspension system are extended causing the vehicle frame to be positioned above design ride height or further away from the travel surface, air is exhausted from the air springs reducing the internal pressure, thereby deflating/compressing them until the axle/suspension system lowers the vehicle frame to the design ride height. As set forth above, the adjustment of the air springs, including regulation of air flow into the air springs and the exhaustion of air from the air springs, is controlled by a mechanically operated valve known in the art as a height control valve. Adjustments to the height control valve and the linkage that controls activation of the valve enable the design ride height to be achieved.

As the vehicle travels over the road and the driver executes maneuvers that cause the axle/suspension system to articulate between a position that compresses the air springs and a position that extends them, the height control valve automatically acts to maintain the design ride height. That is, when the air springs are compressed, the height control valve causes air to be supplied to the air springs from a vehicle air reservoir. Conversely, when the air springs are in an extended position, the height control valve causes air to be exhausted from the air springs to atmosphere. The amount of air that is supplied or exhausted to and from, respectively, the air springs, is based on the duration of the articulation of the suspension beam and the flow rate of the height control valve at a given position.

Subsequent prior art pneumatic control systems have included a solenoid valve which is incorporated into the pneumatic control system that allows the operator of the vehicle to "dump" or exhaust the air springs of the rear axle/suspension system in order to increase maneuverability of the vehicle. The solenoid valve typically is in fluid communication with the conduit disposed between the height control valve and the rear air springs. The solenoid valve is utilized to exhaust the air springs of the suspension assemblies of the rear axle/suspension system when the vehicle operator encounters a situation that requires increased maneuverability of the heavy-duty vehicle. More particularly, the solenoid valve is electrically connected to a control switch that is located in the cab of the heavy-duty vehicle. When the operator desires to exhaust the air springs of the rear axle/suspension system of the vehicle in order to increase maneuverability, the operator engages a switch that sends an electrical supply or impulse to the solenoid valve. Once energized, the solenoid value prohibits the flow of air from the height control valve to the air springs of the rear axle/suspension system and, instead, allows fluid or air in the air springs of the rear axle/suspension system to flow through the solenoid valve to atmosphere. Typically, these prior art pneumatic control systems exhaust all of the air from the air springs of the rear axle/suspension system. By exhausting all of the air in the air springs of the rear axle/suspension system, the trailer longitudinal wheelbase is effectively shortened, as the cargo loads which had previously been imparted approximately equally on both the front and rear axle/suspension systems are shifted forward to the front axle/suspension system of the trailer.

This effective shortening of the longitudinal wheel base of the heavy-duty vehicle as a result of complete exhaustion of the air springs of the rear axle/suspension system increases maneuverability of the vehicle, but may lead to premature failure of certain components of the front and rear axle/suspension systems. Problems which can typically occur in these prior art pneumatic control systems that exhaust all of the air from the air springs of the rear axle/suspension system include: 1) overloading of the front axle/suspension system and its associated components; 2) contact between the jounce stop or bumper of the air spring and the upper bead plate of the air spring in both the front and rear axle/suspension systems; and 3) trapping of the exhausted air springs of the rear axle/suspension system. More particularly, when the air is exhausted as described above in a vehicle which is heavily loaded, the front axle/suspension system to which the cargo loads are effectively transferred can become overloaded, which can lead to premature failure of the front axle/suspension system and its associated components, such as the axle, the suspension assemblies, the air springs, the wheel end assemblies, and the tires.

Also, when the air is exhausted as described above in a vehicle which is heavily loaded, the front axle/suspension system to which the cargo loads are effectively transferred is often unable to maintain vehicle ride height. More specifically, the loads that are transferred to the front axle/suspension system may require a pressure in the air springs that far exceeds the available system pressure. When this occurs, the vehicle height drops until the jounce stop or bumper in each air spring of the front and rear suspension assemblies of the axle/suspension systems contacts the upper bead plate of the air spring. The result being that the vehicle is no longer air suspended. In this state, forces due to road inputs such as bumps or pot-holes, are directly transmitted to the vehicle frame at much higher levels as the bumper stiffness is significantly higher than that of the air spring at design ride height. Such uncontrolled load transfer can exceed the maximum design strength of the air spring jounce stop and the suspension assembly components, possibly causing these components to fail prematurely. In addition, when the jounce stop or bumper in each air spring of the axle/suspension system contacts the upper bead plate, the friction between the jounce stop or bumper and the upper bead plate may greatly reduce the ability of the suspension assemblies to move in a horizontal plane. The movement of the suspension assemblies in a horizontal plane as a result of lateral forces is commonly referred to as lateral compliance steer. The reduction in lateral compliance steer can increase the magnitude of the lateral forces acting on the suspension assemblies when the vehicle makes a turn. Increased lateral forces acting through the suspension assemblies also increase the probability of premature failure of the components of the suspension assemblies. Yet another common issue which is prevalent in current prior art pneumatic control systems is the tendency for the flexible air spring member of the exhausted air spring to pinch or become trapped at the top of the air spring piston. This trapping occurs when the air springs are completely exhausted during a suspension assembly dump, i.e., when the air springs of the rear suspension assembly are exhausted completely. This trapping of the flexible air spring member can increase the probability of premature failure of the air spring. More specifically, the flexible member of the air spring becomes trapped between the internal jounce stop and the upper bead plate of the air spring which can cause damage to the flexible member.

Therefore, a need exists in the art for a pneumatic control system for the air springs of an air-ride axle/suspension system of a heavy-duty vehicle, which overcomes the deficiencies of prior art pneumatic control systems by proportioning air between the suspension assemblies of the axle/suspension systems, such as between the front and rear air springs, side to side, or diagonally, in order to prevent overloading of the axle/suspension systems and to minimize contact between the jounce stop or bumper of the air springs and the upper bead plates of the air springs. Such overloading and undesirable contact can cause the air springs and the suspension assembly components of an axle/suspension system to exceed maximum design strength and increases the probability of premature failure of the axle/suspension systems and their associated components, in addition to decreasing lateral steer compliance of the suspension assemblies which can increase the probability of premature failure of the components. Moreover, minimizing contact between the jounce stop or bumper of the air spring and the upper bead plate of the air spring can prevent pinching or trapping of the flexible member of the air spring, which can minimize the possibility of premature failure of the air spring.

SUMMARY OF THE INVENTION

The objectives of the present invention include providing a pneumatic proportioning system for vehicle air springs which proportions air among the air springs of air-ride axle/suspension systems of a heavy-duty vehicle when one or more of the air springs is exhausted.

Another objective of the present invention is to provide a pneumatic proportioning system for vehicle air springs which minimizes the possibility of overloading one or more of the axle/suspension systems and/or their components.

Yet another objective of the present invention is to provide a pneumatic proportioning system for vehicle air springs which maintains or assures clearance between the jounce stop or bumper of the air spring and the upper bead plate of the air spring such that peak impact loads and lateral forces acting on the suspension assemblies are reduced when the vehicle is executing a turning event in a forward or reverse direction, such as when the vehicle is traversing an urban setting or when the vehicle is executing a yard maneuver.

Yet even another objective of the present invention is to provide a pneumatic proportioning system for vehicle air springs which reduces the likelihood of pinching or trapping of the flexible air spring member near the top of the air spring piston, and which serves to increase air spring life.

A further objective of the present invention is to provide a pneumatic proportioning system for vehicle air springs which maximizes vehicle and axle/suspension system component life.

An even further objective of the present invention is to provide a pneumatic proportioning system for vehicle air springs which reduces vehicle operating costs, by promoting component longevity for the fleet and/or the vehicle operator.

These objectives and advantages are obtained by the pneumatic proportioning system for vehicle air springs of the present invention which includes an air supply and at least a first and second air spring being in fluid communication with the air supply. At least one height control valve is in fluid communication with the air supply and with the first and second air springs. A solenoid valve is in fluid communication with the height control valve and with the second air spring. The solenoid valve exhausts air from the second air spring when the solenoid valve is activated. A proportioning means is in fluid communication with at least the solenoid valve, the first air spring, and atmosphere, for limiting the exhaustion of air from the second air spring whereby loads are proportioned between the first air spring and the second air spring.

DRAWINGS

Exemplary embodiments of the present invention, illustrative of the best modes in which applicants have contemplated applying the principles, are set forth in the following description and are shown in the drawings.

Figure 7:
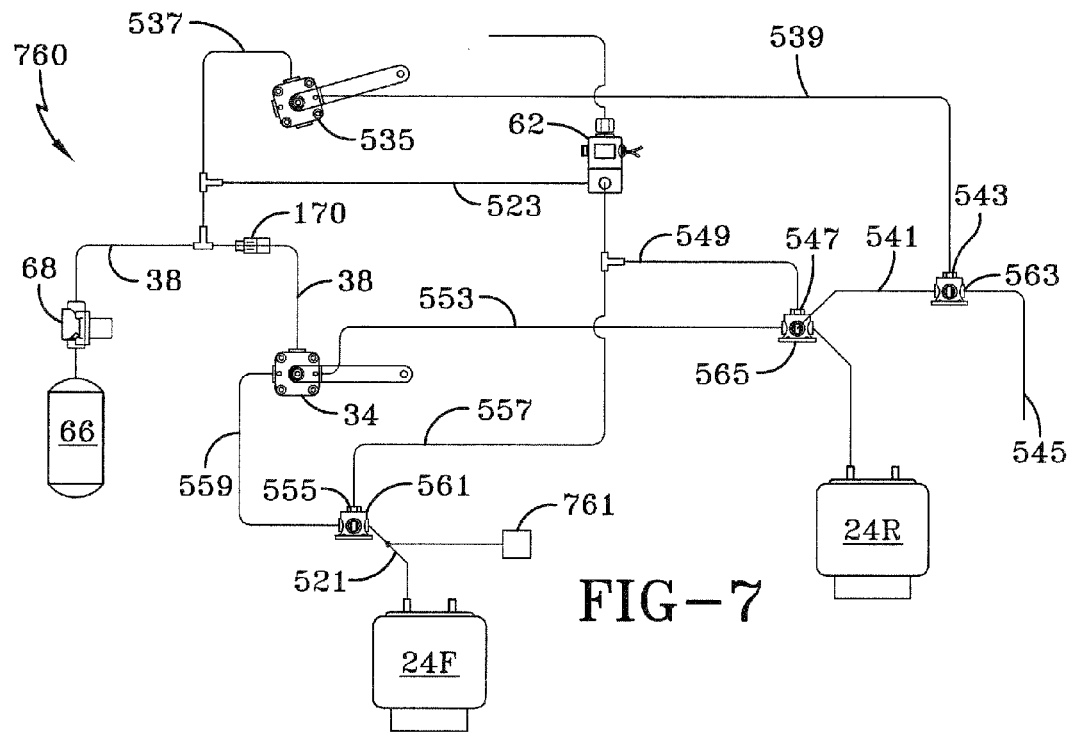
Figure 7A:
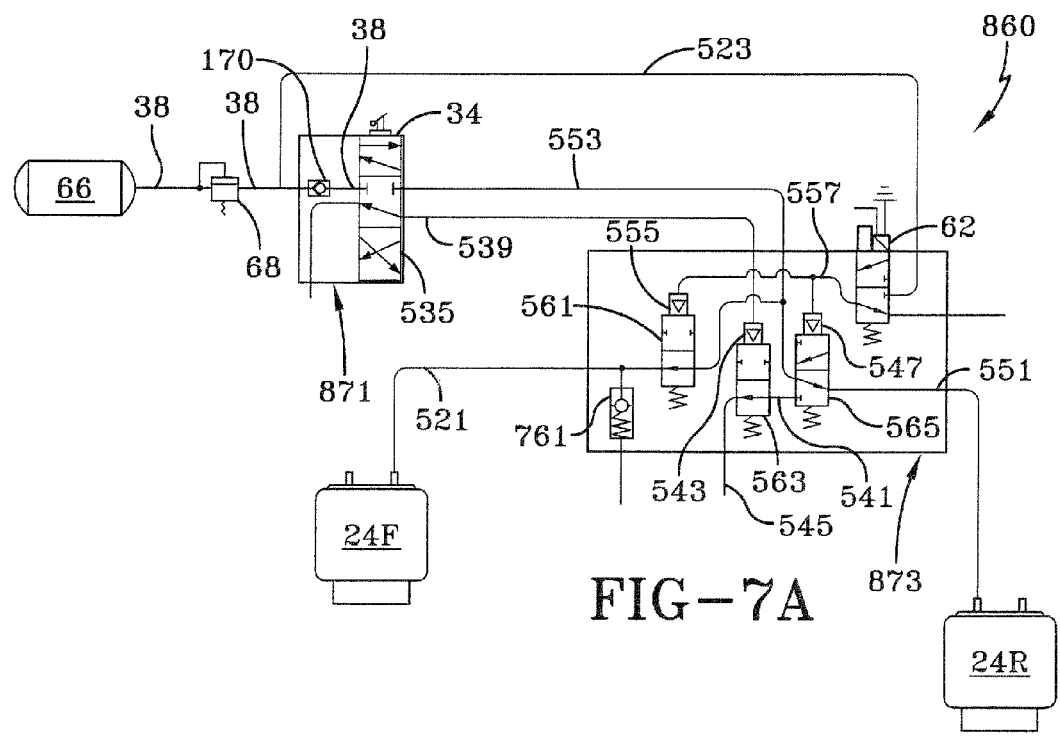

FIG. 7 is a schematic representation of an exemplary seventh embodiment pneumatic proportioning system of the present invention, showing the various components of the proportioning system in fluid communication with each other and with the air springs of the front and rear axle/suspension systems, for proportioning air among the air springs of the front and rear axle/suspension systems; and FIG. 7A is schematic representation of an exemplary eighth embodiment pneumatic proportioning system of the present invention, showing the various components of the proportioning system in fluid communication with each other and with the air springs of the front and rear axle/suspension systems, for proportioning air among the air springs of the front and rear axle/suspension systems.

Similar numerals refer to similar parts throughout the drawings.

DESCRIPTION OF THE PREFERRED EMBODIMENTS

So that the structure, operation, and advantages of the pneumatic proportioning system for air springs of an air-ride axle/suspension system of a heavy-duty vehicle of the present invention can be best understood, a typical prior art pneumatic control system will now be described in the environment in which it is utilized. It is important to note that prior art air-ride axle/suspension system 10, while shown as a beam-type trailing arm axle/suspension system, also includes other types of heavy-duty vehicle air-ride axle/suspension systems known to those skilled in the art, such as leading arm beam-type air-ride axle/suspension systems and air-ride axle/suspension systems other than beam-type. It is also important to note that vehicle frame 12 is generally representative of various types of frames commonly used for heavy-duty vehicles, including primary frames that do not support a subframe, primary frames and/or floor structures that do support a subframe, and subframes themselves. For primary frames and/or floor structures that do support a subframe, the subframe can be non-movable or movable, the latter being commonly referred to as a slider box.

Axle/suspension system 10 includes a pair of generally identical suspension assemblies 14 each suspended from a respective one of a pair of transversely spaced frame hangers 16. Each hanger 16 is secured to and depends from frame 12 of the heavy-duty vehicle. Inasmuch as suspension assemblies 14 are identical, only one will be described hereinbelow and shown in FIG. 1. Suspension assembly 14 includes a trailing arm-type suspension beam 18 which is pivotally mounted at its front end 20 on hanger 16 in a usual manner through the use of a suitable pivot and bushing assembly 22. An air spring 24 is suitably mounted on and extends between the upper surface of a rear end 26 of suspension bean 18 and frame 12. A shock absorber (not shown) also typically is mounted on and extends between beam 18 and frame 12. A brake chamber 30 and other components of a brake system 28 are shown attached to beam 18 by way of example, as it is to be understood that other arrangements for attaching components of the brake system to an axle/suspension system 10 are known in the art. An axle 32 extends between and is captured in the pair of suspension beams 18, and one or more wheels (not shown) are mounted on each end of the axle.

Figure 1:
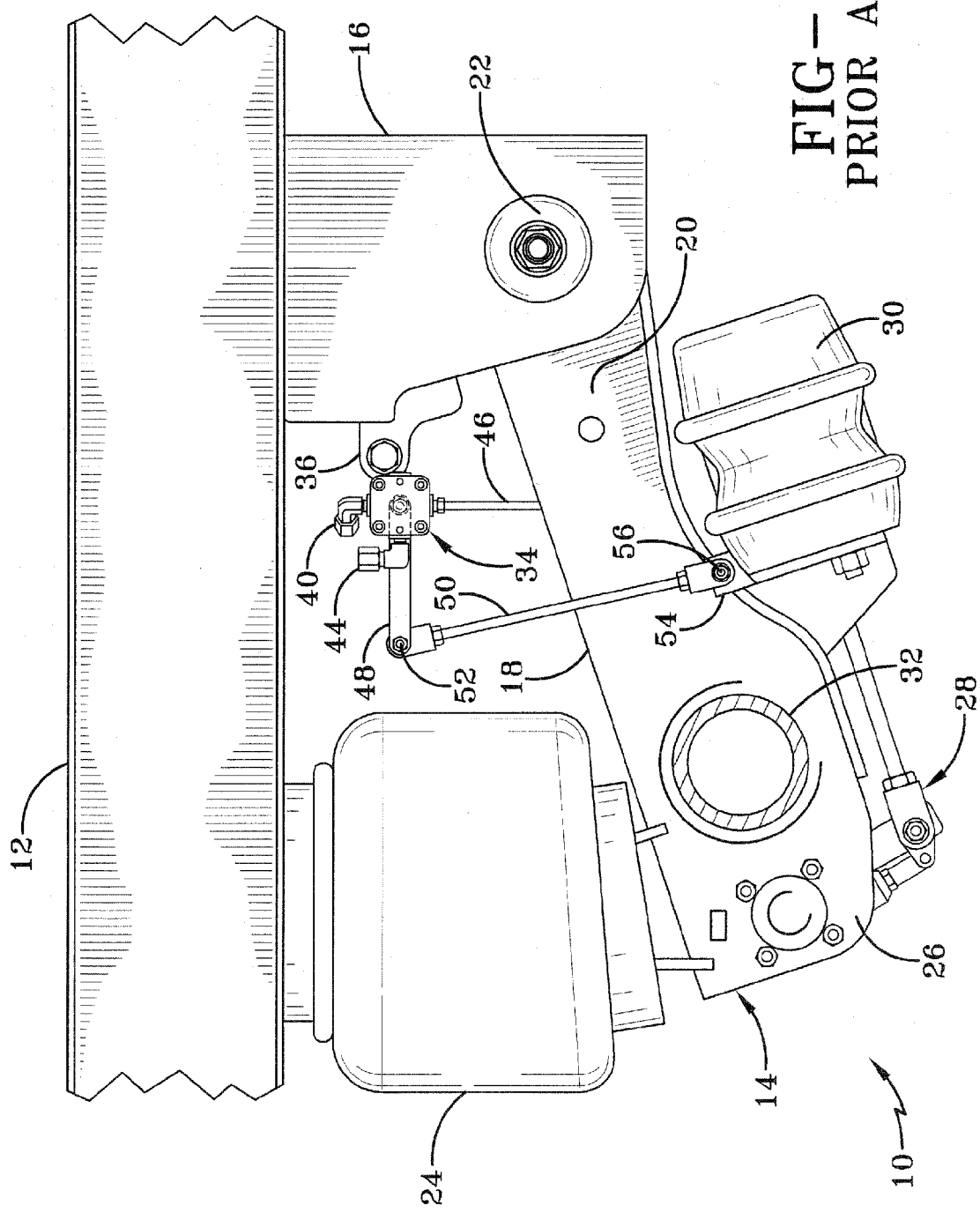
FIG. 1 is a fragmentary elevational view, with portions in section, of one of the suspension assemblies and an axle of an air-ride trailing ant beam-type axle/suspension system, shown depending from a heavy-duty vehicle frame, and further showing a typical height control valve of the prior art.
Figure 2:
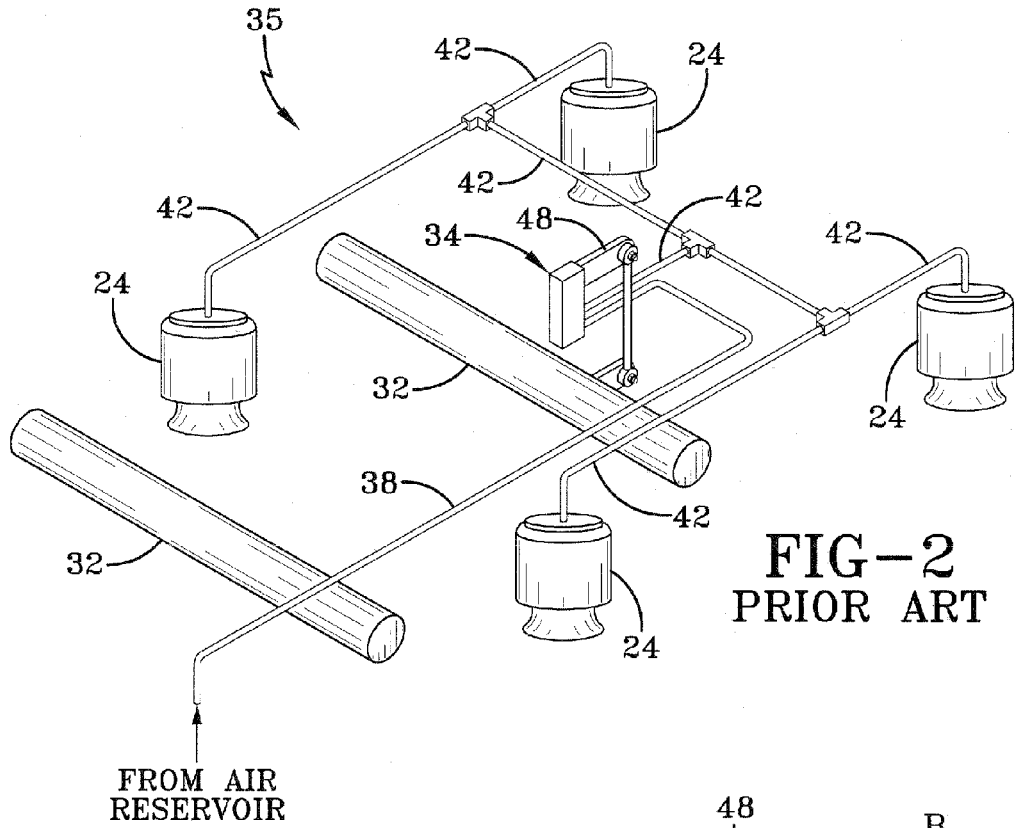
FIG. 2 is a schematic representation of a typical conduit configuration for a pneumatic control system for air springs of suspension assemblies of the prior art, and showing relative positions of the air springs and axles of the axle/suspension systems.
Figure 3:
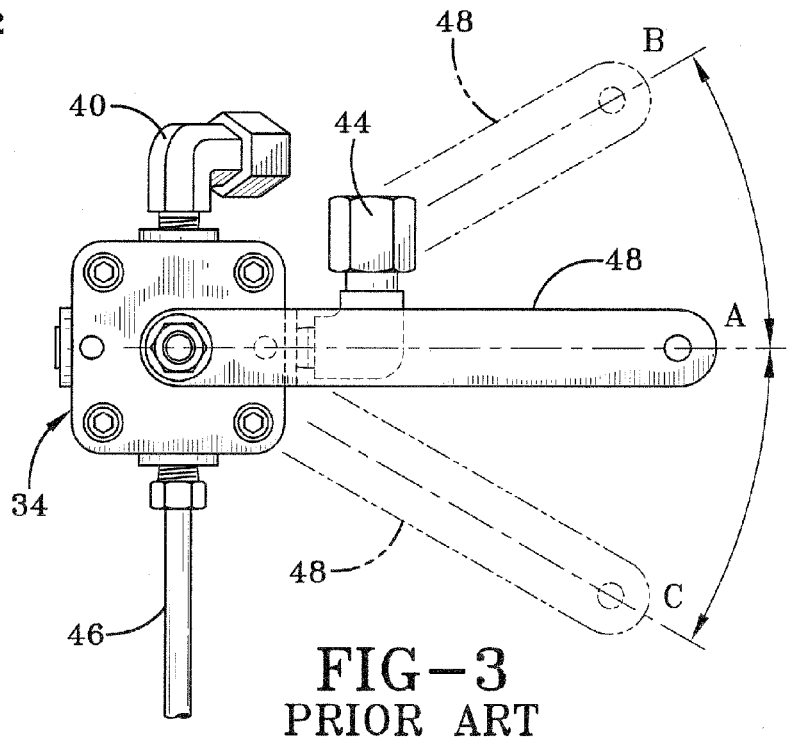
FIG. 3 is an enlarged elevational view of the prior art height control valve of FIG. 15 with alternate valve control arm positions represented by broken lines.

A typical prior art pneumatic control system 35, which utilizes a height control valve 34 such as the one shown in FIGS. 1 and 3, is shown in FIG. 2 and will be described below. Prior art height control valve 34 (FIG. 1) is shown mounted on hanger 16 via a bracket 36 and a secondary spacer (not shown). Pneumatic control system 35 includes an air reservoir conduit 38 which is in fluid communication with height control valve 34 via an air reservoir fitting 40, and provides compressed air to the height control valve from an air reservoir (not shown), such as an air tank, as known to those skilled in the art. With additional reference to FIG. 3, an air spring conduit 42 is in fluid communication with height control valve 34 via an air spring fitting 44 and branches off to each air spring 24, thereby enabling the height control valve to route compressed air to and from the air springs based on certain operational conditions, as will be described below. An exhaust conduit 46 is in fluid communication with and extends from height control valve 34, enabling the height control valve to exhaust compressed air to atmosphere, as will also be described in detail below. It is to be understood that additional pneumatic and/or electronic components (not shown) that are known and used in the art, such as electronic controllers, valves, vents and pneumatic lines, may be used in conjunction with conduits 38, 42, 46 and/or height control valve 34. For example, components of an air spring control system as disclosed in U.S. Pat. No. 6,412,789, issued to Pierce et al on Jul. 2, 2002, and assigned to Hendrickson U.S.A., L.L.C., the assignee of the present invention, may be used.

Referring now to FIGS. 1 and 3, height control valve 34 preferably is a three-way valve that includes a control arm 48, wherein the position of the arm controls the operation of the height control valve. More particularly, when control arm 48 is in a horizontal or neutral position A, height control valve 34 is closed and does not route compressed air from air reservoir conduit 38 (FIG. 2) to air springs 24 via air spring conduits 42, nor does it exhaust air from the air springs to atmosphere via exhaust conduit 46. When control arm 48 is in a fill position B, height control valve 34 routes compressed air from air reservoir conduit 38 to air spring conduits 42 (FIG. 2) and thus to air springs 24, thereby inflating the air springs. When control arm 48 is in an exhaust position C, height control valve 34 exhausts air from air springs 24 via air spring conduits 42, and communicates the exhausted air to exhaust conduit 46 (FIG. 2) and thus to atmosphere.

Automatic actuation of control arm 48, and thus activation of the operation of height control valve 34, is provided by a control valve link 50, as shown in FIG. 1. More specifically, control valve link 50 is pivotally connected at its upper end to control arm 48 via fasteners 52 or other means known in the art, and is also pivotally connected at its lower end to beam 18 via a mounting bracket 54 and fasteners 56, or to a component that is attached to the beam, such as brake chamber 30.

During vehicle operation, when axle/suspension system 10 articulates to an air spring compressed position, the distance between vehicle frame 12 and beam 18 decreases, compressing air spring 24. Since height control valve 34 is connected to hanger 16, which is rigidly connected to vehicle frame 12, the height control valve remains a generally consistent distance from the vehicle frame. To maintain design ride height, when the distance between vehicle frame 12 and beam 18 decreases, control valve link 50 moves control arm 48 upwardly from neutral position A to fill position B, as shown in FIG. 3, thereby activating height control valve 34 and causing the height control valve to route compressed air from air reservoir conduit 38 to air springs 24 via air spring conduits 42, thereby inflating air springs 24, and in turn returning beam 18 to the design ride height.

Conversely, when axle/suspension system 10 articulates to an air spring extended position, the distance between vehicle frame 12 and beam 18 increases, extending air spring 24. To maintain ride height, when the distance between vehicle frame 12 and beam 18 increases, control valve link 50 moves control arm 48 downwardly from neutral position A to exhaust position C, as shown in FIG. 3, thereby activating height control valve 34 and causing the height control valve to exhaust compressed air from air spring 24 via exhaust conduit 46, and in turn returning beam 18 to the design ride height.

As set forth above, prior art pneumatic control system 35 maintains the design ride height of axle/suspension system 10 when the axle/suspension system articulates during vehicle operation. Having now described the structure and operation of prior art pneumatic control system 35, another prior art pneumatic control system 60, which is generally identical to prior art control system 35 but which includes a solenoid valve 62 for exhausting rear air springs 24R of rear axle/suspension system 10, in order to increase the maneuverability of the heavy-duty vehicle during operation, will now be described below.

Figure 3A:
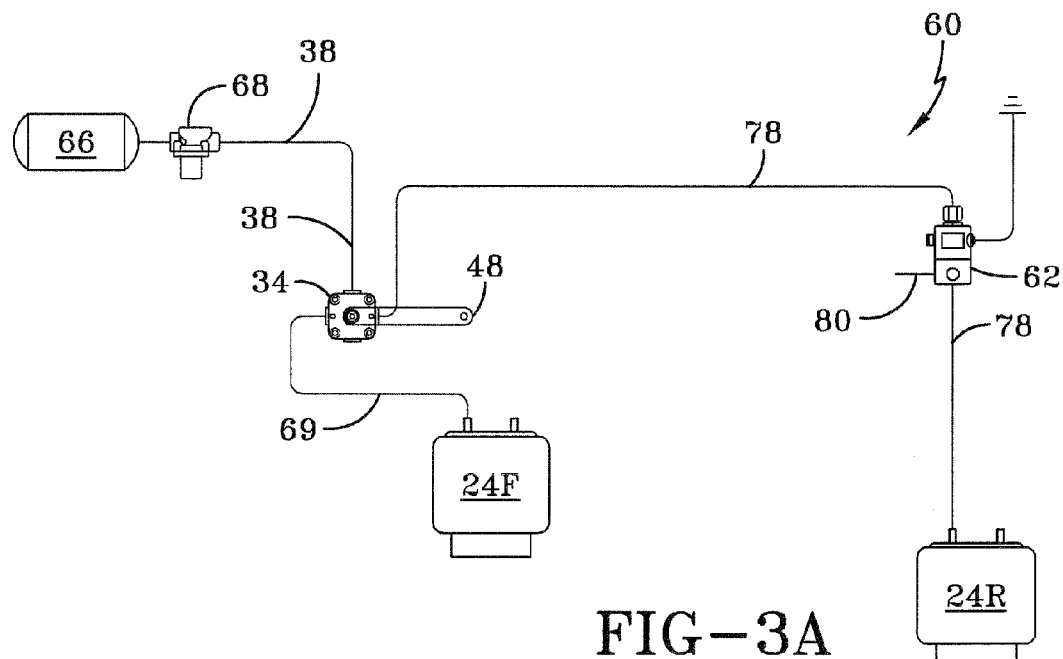
FIG. 3A is a schematic representation of another prior art pneumatic control system similar to the one shown in FIG. 2, but showing the pneumatic control system having a solenoid valve in fluid communication with the height control valve and one of the rear air springs of the rear axle/suspension system for exhausting air from the air spring.

Turning now to FIG. 3A, prior art pneumatic control system 60 is shown schematically and will now be described. As set forth above, prior art pneumatic control system 60 differs from prior art pneumatic control system 35 because it includes a pressure protection valve 68 and solenoid valve 62 for exhausting rear air springs 24R of rear axle/suspension system 10. More particularly, prior art pneumatic control system 60 includes an air reservoir 66, pressure protection valve 68, solenoid valve 62, and height control valve 34 in fluid communication with a pair of rear air springs 24R (only one shown) and with a pair of front air springs 24F (only one shown). More specifically, air reservoir 66 is in fluid communication with height control valve 34 via air reservoir conduit 38, as set forth above for prior art pneumatic control system 35. Pressure protection valve 68 is disposed between and in fluid communication with air reservoir 66 and height control valve 34 via air reservoir conduit 38. Pressure protection valve 68 is a typical pressure protection valve that shuts off the supply of air through air reservoir conduit 38 from air reservoir 66 when the pressure in the air reservoir drops below a pre-set value, typically 70 p.s.i., and is well known to those having skill in the art. Height control valve 34 is in fluid communication with front and rear air springs 24F,R (only one of each shown) of front and rear axle/suspension systems 10, respectively.

More particularly, height control valve 34 is in fluid communication with a rear air spring conduit 78 which in turn is in fluid communication with rear air springs 24R (only one shown). Height control valve 34 also is in fluid communication with front air springs 24F (only one shown) via a front air spring conduit 69. Solenoid valve 62 is in fluid communication with rear air spring conduit 78 which is disposed between and in fluid communication with height control valve 34 and rear air springs 24R. Solenoid valve 62 is a typical solenoid valve well known to those having skill in the art and includes an exhaust port 80 which opens to atmosphere. Solenoid valve 62 is electrically connected to a control mechanism (not shown) which is typically located in the cab (not shown) of the vehicle. When the operator of the vehicle, which has been loaded with cargo, desires to increase the maneuverability of the heavy-duty vehicle, such as when the operator encounters an urban driving setting or a docking situation, the operator manually activates the control mechanism (not shown), which is typically an electrical switch or button, to activate prior art pneumatic control system 60. More particularly, when pneumatic control system 60 is activated, solenoid valve 62 is energized to prevent the flow of fluid from height control valve 34, through rear air spring conduit 78 and into rear air springs 24R (only one shown), and instead allows fluid to flow from the rear air springs and the rear air spring conduit into exhaust port 80 of the solenoid valve and to atmosphere. Therefore, by activating the control mechanism (not shown) connected to pneumatic control system 60 of the prior art, the operator of the vehicle is able to dump or exhaust air from rear air springs 24R of rear axle/suspension system 10 of the vehicle which effectively transfers the weight of the trailer onto front air springs 24F which increases the maneuverability of the vehicle.

As set forth above, prior art pneumatic control system 60 typically exhausts all of the air from rear air springs 24R. By exhausting all of the air in rear air springs 24R of rear axle/suspension system 10, the trailer longitudinal wheel-base is effectively shortened, as the cargo load which had previously been imparted on both front and rear axle/suspension systems 10 of the trailer is shifted to the front axle/suspension. This effective shortening of the longitudinal wheel base of the heavy-duty vehicle increases the maneuverability of the vehicle, but can increase the probability of premature failure of certain components of axle/suspension system 10.

More particularly, because prior art pneumatic control system 60 typically exhausts all of the air from air springs 24R of rear axle/suspension system 10, the front axle/suspension system is required to support a significantly increased amount of the cargo load of the vehicle, which load has been effectively shifted to the front axle/suspension system during exhaustion of air from the air springs of the rear axle/suspension system. Shifting the cargo load to front axle/suspension system 10 can overload the front axle/suspension system and its associated components, such as axle 32, front air springs 24F, wheel end assemblies (not shown) and tires (not shown). This overloading can cause premature failure of front axle/suspension system 10 and its associated components.

In addition, because the pressure in front air springs 24F of front axle/suspension system 10 may be insufficient to support the additional cargo load, the vehicle height drops until the jounce stops or bumpers (not shown) in front and/or rear air springs 24F,R contact the upper bead plate (not shown) of the air springs. When the jounce stops or bumpers in front and/or rear air springs 24F,R contact the upper bead plate, the friction between the jounce stop or bumper and the upper bead plate can greatly reduce the compliance of suspension assemblies 14 to move in a horizontal plane, which is commonly referred to as lateral steer compliance. Decreasing lateral steer compliance in suspension assemblies 14 can cause premature failure of the suspension assemblies and their associated components.

Yet another problem associated with prior art pneumatic control system 60 is the tendency for the flexible member of rear air springs 24R of exhausted rear axle/suspension system 10 to pinch or become trapped at the top of the air spring piston (not shown). The trapping occurs when rear air springs 24R are completely exhausted by prior art pneumatic control system 60. The flexible member of the air spring becomes trapped between the internal jounce stop and the upper bead plate of the air spring which can cause damage to the flexible member of the air spring.

Figure 4:
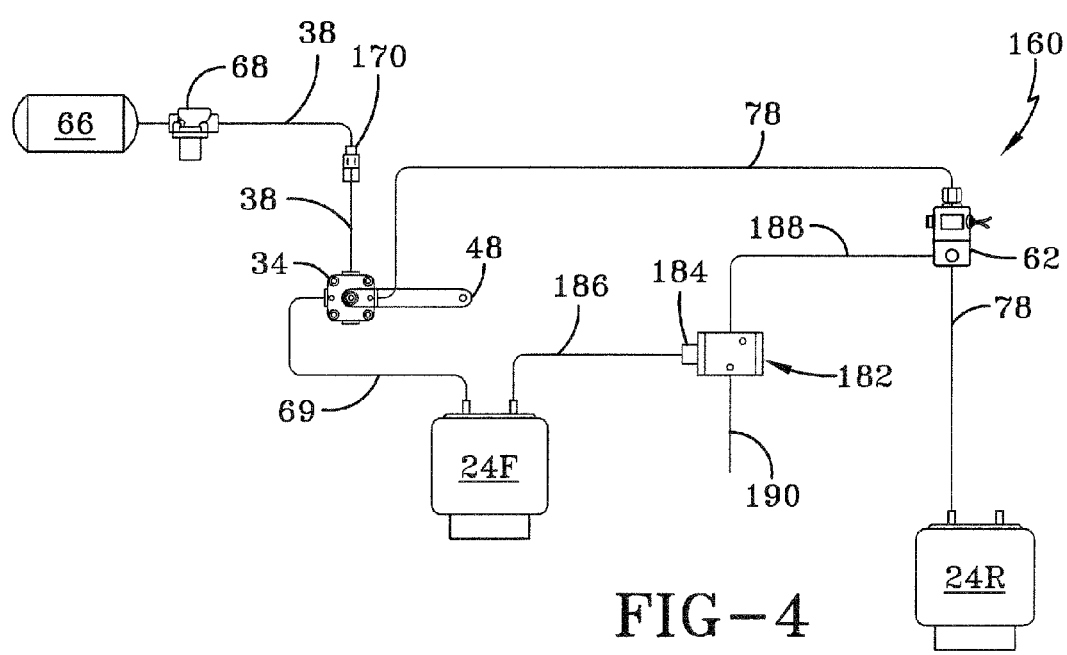
FIG. 4 is a schematic representation of an exemplary first embodiment pneumatic proportioning system of the present invention, showing the various components of the proportioning system in fluid communication with each other and with the air springs of the front and rear axle/suspension systems, for proportioning air among the air springs of the front and rear axle/suspension systems.

Turning now to FIG. 4, an exemplary first embodiment pneumatic proportioning system for heavy-duty vehicle air springs of the present invention is schematically shown and is indicated generally at 160. The general appearance, arrangement, installation, and operation of pneumatic proportioning system 160 of the present invention is similar to that of prior art pneumatic control system 60 shown in FIG. 3A and described hereinabove. Because exemplary first embodiment pneumatic proportioning system 160 is similar to prior art pneumatic control system 60, only the differences between the first embodiment pneumatic proportioning system and the prior art pneumatic control system will be described immediately below. The principle differences between first embodiment pneumatic proportioning system 160 and prior art pneumatic control system 60 are the inclusion of a one-way check valve 170, and a pilot valve 182. More specifically, pilot valve 182 is in fluid communication with solenoid valve 62 and with front air springs 24F (only one shown), in order to proportion air between the air springs of front and rear axle/suspension systems 10.

More particularly, one-way check valve 170 is in fluid communication with air reservoir conduit 38 and is disposed between pressure protection valve 68 and height control valve 34. The location of one-way check valve 170 enables fluid or air to flow from air reservoir 66, through air reservoir conduit 38 and into height control valve 34. One-way check valve 170 prevents fluid flow in the opposite direction from height control valve 34 back into air reservoir 66.

Pilot valve 182 is a normally open, two-position, two-way air-pilot valve having a spring return and is well known to those having skill in the art. Pilot valve 182 includes a pilot port 184 which is in fluid communication with front air springs 24F (only one shown) via a pilot-air spring conduit 186 in a manner well known to those having skill in the art. Pilot valve 182 also is in fluid communication with solenoid valve 62 via a pilot-solenoid conduit 188. Pilot valve 182 further includes an exhaust port 190 which is open to atmosphere. Pilot valve 182, when in its normally open configuration, allows air to flow through the pilot valve and out through exhaust port 190 to atmosphere. Pilot valve 182 is designed to close and, therefore, prevent further fluid flow through the pilot valve and out through exhaust port 190, once a desired pressure in pilot port 184 is reached. That desired pressure is generally equal to a pressure measured in front air springs 24F, above which the components of axle/suspension system 10 are known to begin to prematurely fail. Because the desired pilot port pressure corresponds to this threshold limit of the components of axle/suspension system 10, the desired pilot port pressure can be adjusted, by substituting pilot valve 182 with a pilot valve which has a different pilot port pressure threshold in order to accommodate different limits for different types of axle/suspension systems 10 and/or associated components which are used for different applications.

Figure 4A:
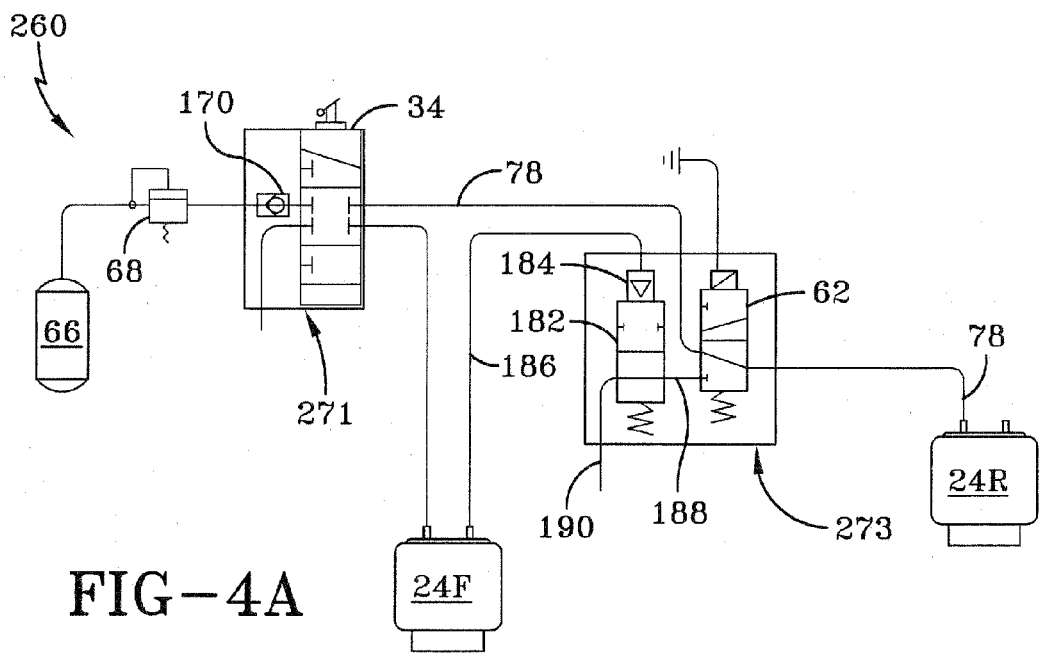
FIG. 4A is a schematic representation of an exemplary second embodiment pneumatic proportioning system of the present invention, showing the various components of the proportioning system in fluid communication with each other and with the air springs of the front and rear axle/suspension systems, for proportioning air among the air springs of the front and rear axle/suspension systems.

Turning now to FIG. 4A, a schematic representation of an exemplary second embodiment pneumatic proportioning system of the present invention is shown and indicated generally at 260, and now will be described. Because exemplary second embodiment pneumatic proportioning system 260 is similar to exemplary first embodiment pneumatic proportioning system 160, only the differences between the two embodiments will be described immediately below.

The principle differences between exemplary second embodiment pneumatic proportioning system 260 and exemplary first embodiment pneumatic proportioning system 160 are that in the second embodiment, height control valve 34 and one-way check valve 170 are integrated with one another, and pilot valve 182, pilot-solenoid conduit 188, and solenoid valve 62 are also integrated with one another. More particularly, height control valve 34 and one-way check valve 170 are integrated into a first valve body 271. Pilot valve 182, pilot-solenoid conduit 188, and solenoid valve 62 are integrated into a second valve body 273. The remaining structure and arrangement of exemplary second embodiment pneumatic proportioning system 260 is generally identical to the structure of exemplary first embodiment pneumatic proportioning system 160 set forth above.

Figure 4B:
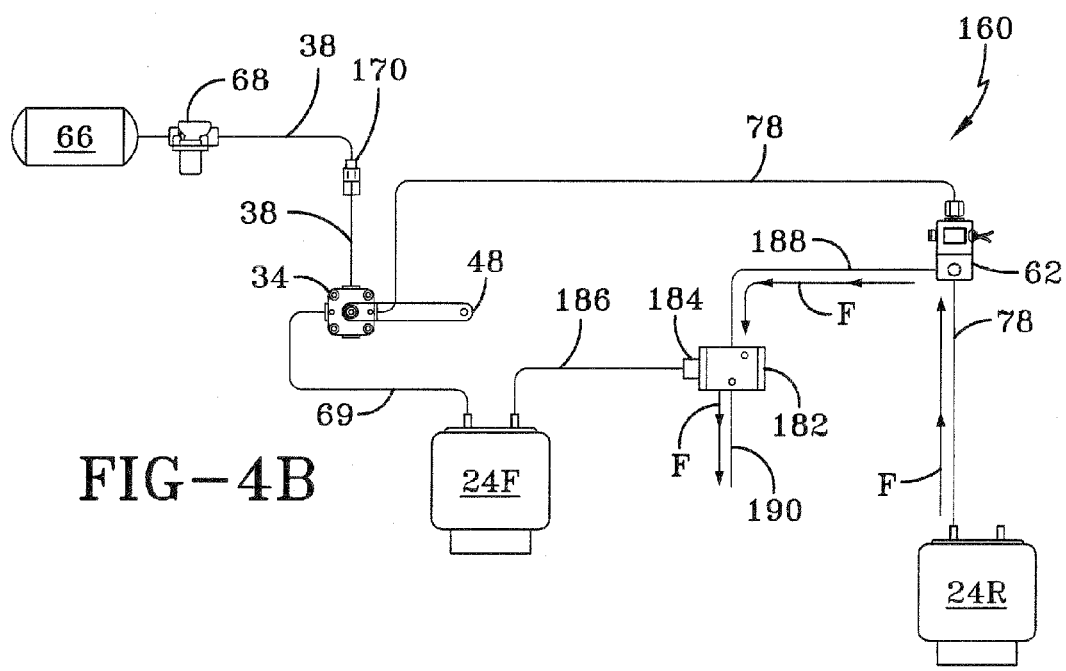
FIG. 4B is a schematic representation of the exemplary first embodiment pneumatic proportioning system shown in FIG. 4, depicting the proportioning of air between the front and rear air springs when the designated pressure in the pilot valve has not been reached.
Figure 4C:
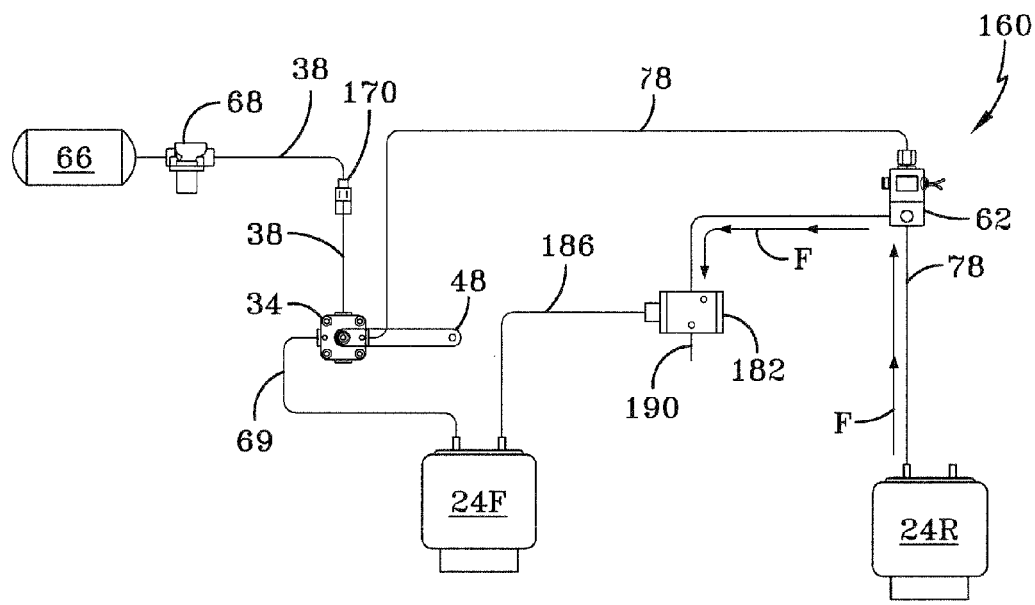
FIG. 4C is a schematic representation of the exemplary first embodiment pneumatic proportioning system shown in FIG. 4, depicting the proportioning of air between the front and rear air springs when the designated pressure in the pilot valve has been reached or exceeded.

Having now described the similar structures and arrangements of exemplary first and second embodiment pneumatic proportioning systems 160,260, respectively, of the present invention, their operation on a loaded vehicle now will be described. Because the operation of first and second embodiment pneumatic proportioning systems 160,260 is generally identical, only the operation of first embodiment pneumatic proportioning system 160 is shown in FIGS. 4B and 4C and will be described immediately below, with the understanding that exemplary second embodiment pneumatic proportioning system 260 functions in generally the same manner.

First embodiment pneumatic proportioning system 160 is designed to proportion air between front and rear air springs 24F,R of front and rear axle/suspension systems 10, respectively, to transfer loads from the rear air springs to the front air springs so that maneuverability of the heavy-duty vehicle can be enhanced and to minimize the likelihood of potential overload of the front axle/suspension system. Unlike prior art pneumatic control system 60, which generally requires that an operator flip a switch in the cab of the vehicle to energize solenoid valve 62, to in turn exhaust rear air springs 24R to atmosphere, first embodiment pneumatic proportioning system 160 of the present invention is capable of being activated either by a manual switch or by an automatic electronic control.

When first embodiment pneumatic proportioning system 160 is activated in order to increase the maneuverability of the vehicle, solenoid valve 62 is energized and directs air from rear air springs 24R and rear air spring conduit 78, through pilot-solenoid conduit 188 into pilot valve 182. If the pressure in front air springs 24F is less than the desired pilot pressure of pilot port 184 of pilot valve 182, which is normally the case when proportioning system 160 is first activated, air from the pilot-solenoid conduit is directed by the pilot valve into exhaust port 190 of the pilot valve and released to atmosphere. More particularly, air from rear air springs 24R, rear air spring conduit 78, and pilot-solenoid conduit 188 is directed into pilot valve 182 and out of exhaust port 190 to atmosphere, as shown by arrows F in FIG. 4B. This allows air from rear air springs 24R to be exhausted to atmosphere. As the air is exhausted from rear air springs 24R, cargo loads are transferred to the front air springs of front axle/suspension system 10. As the cargo loads are transferred to front air springs 24F of front axle/suspension system 10, pressure in the air springs of the front axle/suspension system increases. Once the pressure in front air springs 24F reaches or exceeds the desired pilot pressure of pilot port 184 of pilot valve 182, the pilot valve closes, and the air from rear air springs 24R, air spring conduit 78, and pilot-solenoid conduit 188 is prevented from flowing into exhaust port 190 of the pilot valve, which effectively prevents further air flow through the pilot valve as shown by arrows F in FIG. 4C, thus preventing any further exhaustion of the rear air springs. This minimizes the potential of overloading front axle/suspension system 10 and also minimizes the likelihood of jounce stop or bumper contact with the mounting bracket in the front and rear air springs, which in turn increase lateral steer compliance of rear suspension assemblies 14, and also reduces trapping of the flexible member of the rear air springs. Once the pressure in front air springs 24F has fallen below the desired pilot pressure of pilot port 184 of pilot valve 182, then air is once again allowed to flow from rear air springs 24R, through the pilot valve into exhaust port 190, and released to atmosphere (FIG. 4B). If, when pneumatic proportioning system 160 is activated, the pressure in front air springs 24F has already reached or exceeded the desired pilot pressure of pilot port 184 of pilot valve 182, then, as set forth above, no air from rear air springs 24R is permitted to exhaust to atmosphere. By proportioning the exhaustion of air from rear air springs 24R of rear axle/suspension system 10 based upon the pressure of front air springs 24F of the front axle/suspension system, pneumatic proportioning system 160 minimizes the likelihood of overloading front axle/suspension system 10 and also minimizes the potential of jounce stop or bumper contact with the upper bead plate in both the front and rear air springs, thereby increasing lateral steer compliance of suspension assemblies 14, and reducing trapping of the flexible member of the rear air springs, both of which can lead to premature failure of components of the suspension assemblies.

Figure 5:
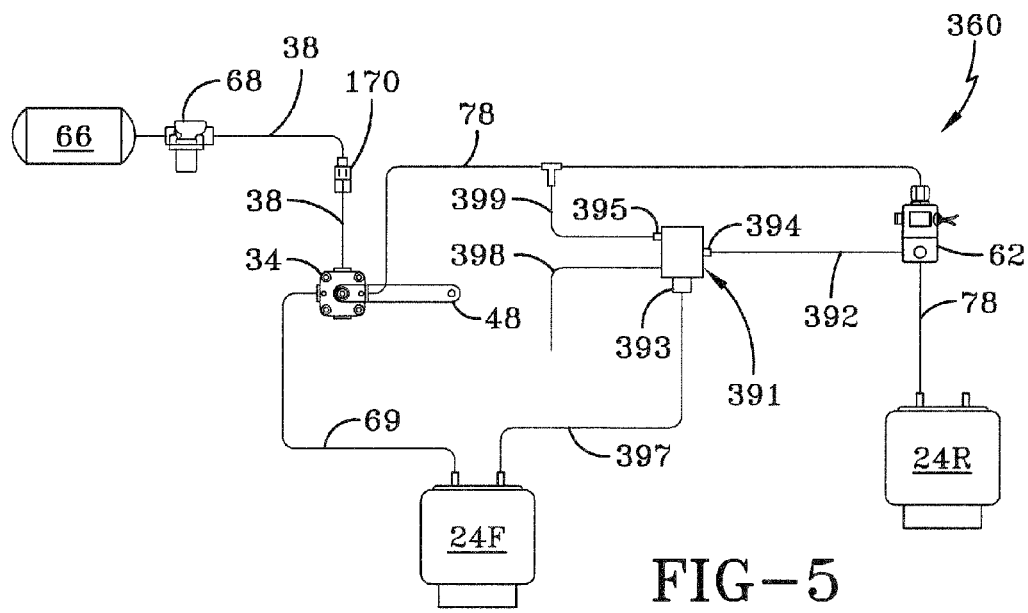
FIG. 5 is a schematic representation of an exemplary third embodiment pneumatic proportioning system of the present invention, showing the various components of the proportioning system in fluid communication with each other and with the air springs of the front and rear axle/suspension systems, for proportioning air among the air springs of the front and rear axle/suspension systems.

Turning now to FIG. 5, an exemplary third embodiment of the pneumatic proportioning system for heavy-duty vehicle air springs of the present invention is schematically shown and is indicated generally at 360. The appearance, arrangement, installation, and operation of pneumatic proportioning system 360 of the present invention is similar to that of first embodiment pneumatic proportioning system 160 shown in FIG. 4. Because exemplary third embodiment pneumatic proportioning system 360 is similar to first embodiment, pneumatic proportioning system 160, only the differences between the two systems will be described immediately below. The principle difference between third embodiment pneumatic proportioning system 360 and first embodiment pneumatic proportioning system 160 is the inclusion of a proportioning relay valve 391 in place of pilot valve 182. More specifically, proportioning relay valve 391 is in fluid communication with solenoid valve 62, front air springs 24F, and rear air spring conduit 78, in order to proportion air between the air springs of front and rear axle/suspension system 10.

More particularly, proportioning relay valve 391 is a typical proportioning relay valve and is well known to those having skill in the art. Proportioning relay valve 391 is in fluid communication with solenoid valve 62 via a proportioning relay valve conduit 392. More specifically, proportioning relay valve 391 includes a control port 393, a supply port 395, and a delivery port 394. Control port 393 is in fluid communication with front air springs 24F (only one shown) via a first valve-air spring conduit 397. Supply port 395 is in fluid communication with rear air spring conduit 78 and is disposed between height control valve 34 and solenoid valve 62 via a second valve-air spring conduit 399. Delivery port 394 is in fluid communication with proportioning relay valve conduit 392. Proportioning relay valve 391 further includes an exhaust port 398 which is open to atmosphere.

Proportioning relay valve 391 regulates the flow of air into and out of delivery port 394 when solenoid value 62 is energized based on the pressure ratio which exists between delivery port 394 which is in fluid communication with rear air spring conduit 78 and which is equivalent to the pressure in air springs 24R of rear axle/suspension system 10, and control port 393 which is in fluid communication with first valve-air spring conduit 397 and which is equivalent to the pressure in air springs 24F of the front axle/suspension system. The preferred ratio of delivery port 394 relative to control port 393 is about 70%, i.e., it is preferred that proportioning relay valve 391 maintain a pressure in the delivery port that is about 70% of the pressure in the control port. Maintenance of this preferred ratio increases the likelihood that front axle/suspension system 10 will not become overloaded during a rear axle dump. It should be understood that proportioning relay valves 391 having other preferred ratios of delivery port 394 relative to control port 393 are also contemplated by the present invention, such as preferred ratios that fall between about 50% and about 90%. It should also be understood that proportioning relay valve 391 could include a preferred ratio of delivery port 394 relative to control port 393 that is variable based upon a pressure in front or rear air springs 24F,R.

Figure 5A:
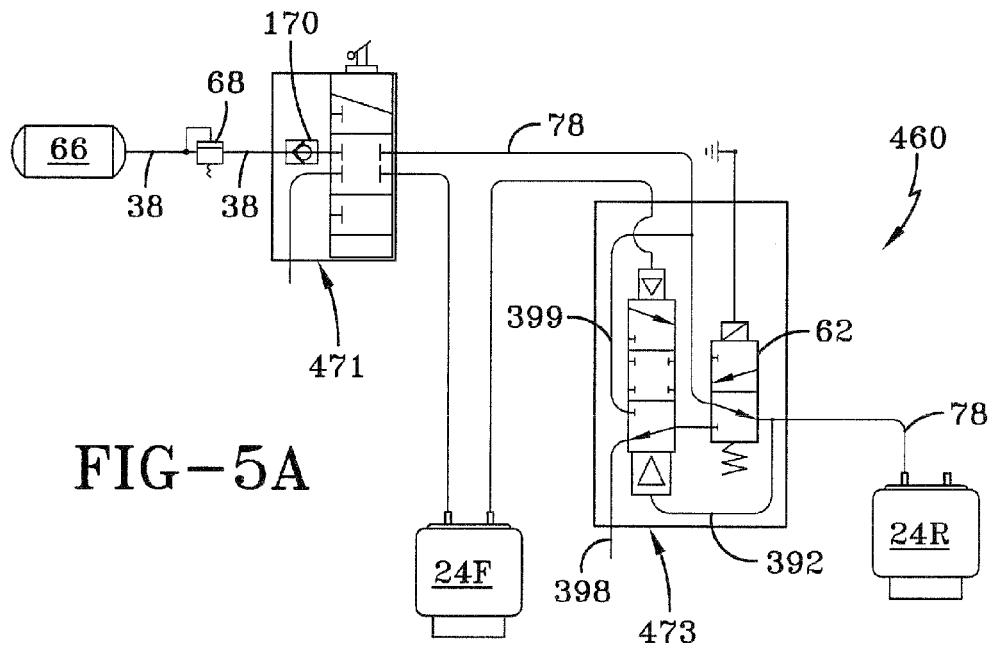
FIG. 5A is a schematic representation of an exemplary fourth embodiment pneumatic proportioning system of the present invention, showing the various components of the proportioning system in fluid communication with each other and with the air springs of the front and rear axle/suspension systems, for proportioning air among the air springs of the front and rear axle/suspension systems.

Turning now to FIG. 5A, a schematic representation of an exemplary fourth embodiment of the pneumatic proportioning system for heavy-duty vehicle air springs of the present invention is shown, is indicated generally at 460, and now will be described. Because exemplary fourth embodiment pneumatic proportioning system 460 is similar to exemplary third embodiment pneumatic proportioning system 360, only the differences between the two embodiments will be described below.

The principle differences between fourth embodiment pneumatic proportioning system 460 and third embodiment pneumatic proportioning system 360 are that in the fourth embodiment, height control valve 34 and one-way check valve 170 are integrated with one another, and proportioning relay valve 391, proportioning relay conduit 392, second valve-air spring conduit 399, and solenoid valve 162 are also integrated with one another. More particularly, height control valve 34 and one-way check valve 170 are integrated into a first valve body 471. Proportioning relay valve 391, proportioning relay conduit 392, second valve-air spring conduit 399, and solenoid valve 62 are integrated into a second valve body 473. The remaining structure and arrangement of fourth embodiment pneumatic proportioning system 460 is generally identical to the structure of third embodiment pneumatic proportioning system 360 set forth above.

Having now described the similar structures and arrangements of exemplary third and fourth embodiment pneumatic proportioning systems 360,460, respectively, of the present invention, their operation on a loaded vehicle now will be described. Because the operation of third and fourth embodiment pneumatic proportioning systems 360,460 is generally identical, only the operation of third embodiment pneumatic proportioning system 360 is shown in FIGS. 5B and 5C and will be described immediately below, with the understanding that exemplary fourth embodiment pneumatic proportioning system 460 functions in generally the same manner.

Third embodiment pneumatic proportioning system 360 is designed to proportion air between front and rear air springs 24F,R of front and rear axle/suspension systems 10, respectively, to transfer loads from the rear air springs to the front air springs of the front and rear suspension assemblies to increase maneuverability of the heavy-duty vehicle and to minimize the likelihood of potential overload of the front axle/suspension system. Unlike prior art pneumatic control system 60, which generally requires that an operator flip a switch in the cab of the vehicle to energize solenoid valve 62, to in turn exhaust rear air springs 24R to atmosphere, third embodiment pneumatic proportioning system 360 of the present invention, like first and second exemplary embodiment pneumatic proportioning systems 160,260 described above, is capable of being activated by either a manual switch or by an automatic electronic control.

Figure 5B:
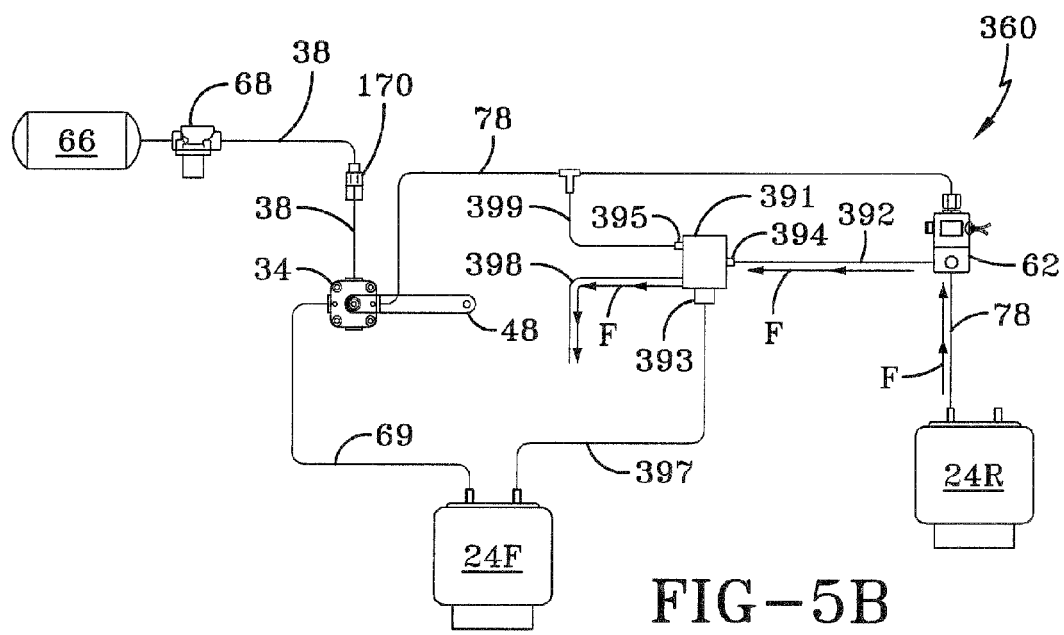
FIG. 5B is a schematic representation of the exemplary third embodiment pneumatic proportioning system shown in FIG. 5, depicting the proportioning of air between the front and rear air springs of the proportioning system when the designated pressure ratio in the proportioning relay valve has not been reached.
Figure 5C:
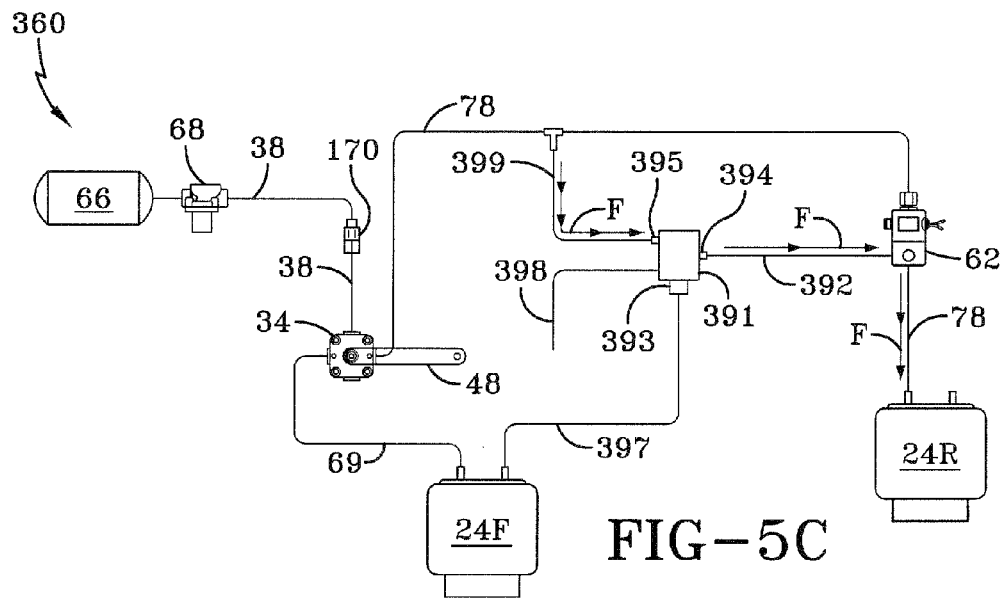
FIG. 5C is a schematic representation of the exemplary third embodiment pneumatic proportioning system shown in FIG. 5, depicting the proportioning of air between the front and rear air springs of the proportioning system when the designated pressure ratio in the proportioning relay valve has been reached.

Turning now to FIG. 5B, when third embodiment pneumatic proportioning system 360 is activated, solenoid valve 62 is energized and directs air from rear air springs 24R and rear air spring conduit 78, through the solenoid valve to proportioning relay valve conduit 392. Air then travels through delivery port 394 into proportioning relay valve 391. If the pressure of the air in delivery port 394 of proportioning relay valve 391 is greater than about 70% of the pressure of the air in control port 393 of the proportioning relay valve, which is normally the case when proportioning system 360 is first activated, air from rear air springs 24R is permitted to flow via rear air spring conduit 78 and proportioning relay valve conduit 392 through the delivery port into exhaust port 398 of proportioning relay valve 391, where the air is released to atmosphere. More particularly, air is allowed to flow from rear air springs 24R, through rear air spring conduit 78, through solenoid valve 62, through proportioning relay valve conduit 392, through delivery port 394 of proportioning relay valve 391, and out of exhaust port 398 to atmosphere, as shown by arrows F in FIG. 5B. This allows air from rear air springs 24R to be exhausted to atmosphere.

As the air is exhausted from rear air springs 24R, cargo loads are transferred to the front air springs of front axle/suspension system 10. As the cargo loads are transferred to front air springs 24F, pressure in the front air springs increases. Once the ratio of the pressure of the air in delivery port 394, which is equivalent to the pressure in the rear air springs 24R, relative to the pressure of the air in control port 393, which is equivalent to the pressure in front air springs 24F, has fallen below the designated threshold ratio of about 70%, then proportioning relay valve 391 shuts off air flow from the delivery port to the exhaust port. Air is directed from supply port 395 to the delivery port and to the rear air springs as shown in FIG. 5C as the pressure ratio between delivery port 394 and control port 393 is below 70%. Thus, proportioning relay valve 391 is able to maintain the desired pressure ratio between rear air springs 24R and front air springs 24F. This prevents rear air springs 24R from becoming completely exhausted which minimizes the likelihood of potentially overloading front axle/suspension system 10 and also minimizes the likelihood of jounce stop or bumper contact with the mounting bracket in the front and rear air springs, which in turn increases lateral steer compliance of front and rear suspension assemblies 14, and also reduces trapping of the flexible member of the front and rear air springs.

If, when pneumatic proportioning system 360 is activated, the ratio of the pressure of the air in delivery port 394 relative to the pressure of the air in control port 393 is below the designated threshold ratio of about 70%, then, as set forth above, no air from rear air springs 24R is permitted to exhaust to atmosphere. By proportioning the exhaustion of air from rear air springs 24R based upon the pressure ratio of the rear air springs relative to front air springs 24F, pneumatic proportioning system 360 minimizes the likelihood of potentially overloading front axle/suspension system 10 and also minimizes the likelihood of jounce stop or bumper contact with the mounting bracket in both the front and rear air springs, thereby increasing lateral steer compliance of suspension assemblies 14, and also reducing trapping of the flexible member of the rear air springs, both of which can lead to premature failure of the axle/suspension systems and their associated components.

Figure 6:
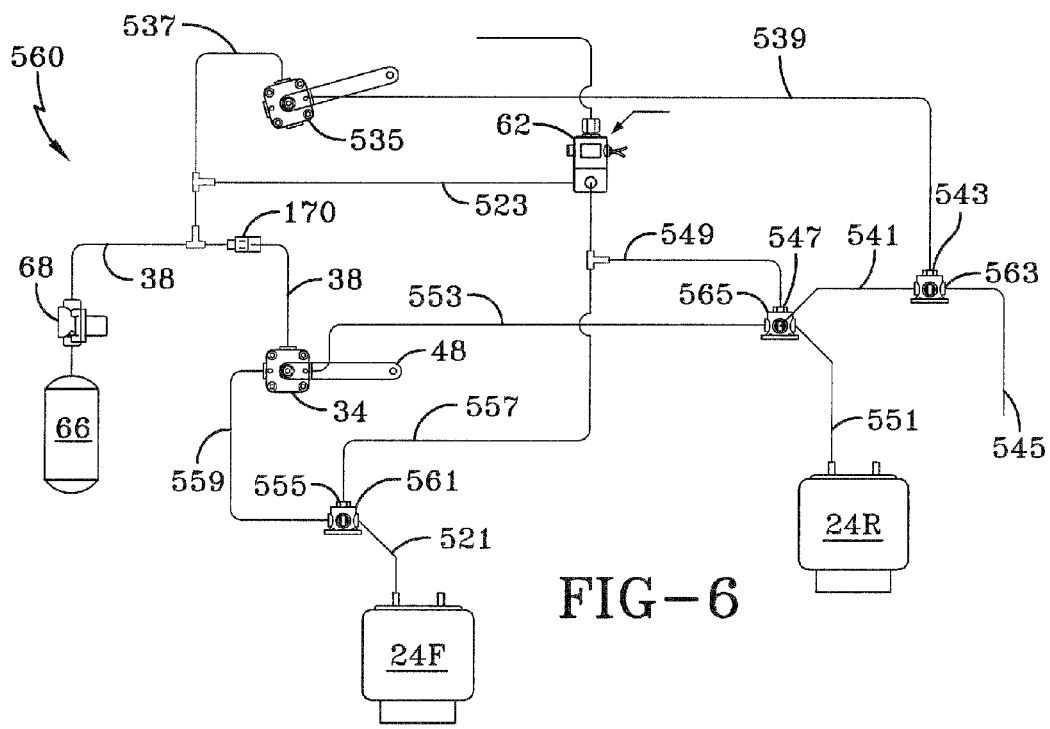
FIG. 6 is a schematic representation of an exemplary fifth embodiment pneumatic proportioning system of the present invention, showing the various components of the proportioning system in fluid communication with each other and with the air springs of the front and rear axle/suspension systems, for proportioning air among the air springs of the front and rear axle/suspension systems.

Turning now to FIG. 6, an exemplary fifth embodiment pneumatic proportioning system for heavy-duty vehicle air springs of the present invention is schematically shown and is indicated generally at 560. The general appearance, arrangement, installation, and operation of pneumatic proportioning system 560 of the present invention is similar to that of prior art pneumatic control system 60 shown in FIG. 3A. Because exemplary fifth embodiment pneumatic proportioning system 560 is similar to prior art pneumatic control system 60, only the differences between the two systems will be described immediately below. The principle differences between exemplary fifth embodiment pneumatic proportioning system 560 and prior art pneumatic control system 60 are the inclusion of three pilot valves 561, 563 and 565, a second height control valve 535, and one-way check valve 170 into the exemplary fifth embodiment pneumatic proportioning system, in order to proportion air between front and rear air springs 24F,R of front and rear axle/suspension systems 10, respectively.

More particularly, exemplary fifth embodiment pneumatic proportioning system 560 of the present invention includes second height control valve 535 which is in fluid communication with air reservoir conduit 38 and with second pilot valve 563. More specifically, second height control valve 535 is in fluid communication with air reservoir conduit 38 and is disposed between pressure protection valve 68 and one-way check valve 170 via a pressure protection valve-height control valve conduit 537. Second height control valve 535 is in fluid communication with a pilot port 543 of second pilot valve 563 via a first conduit 539. Second height control valve 535 includes a mechanical linkage (not shown) which presets the height control valve to activate at about 1.5 inches to about 0.25 inches above bumper contact of front air springs 24F. In other words, once the distance above bumper contact of front air springs 24F becomes less than about 1.5 inches to about 0.25 inches, then height control valve 535 is activated to allow air to pass through the valve to pilot port 543 of second pilot valve 563. Second height control valve 535 is mechanically fastened adjacent front axle/suspension system 10, but could alternatively be mechanically fastened near the rear axle/suspension system. Second pilot valve 563 is a normally open, two position, two way air-pilot valve with a spring return generally well known to those having skill in the art. As set forth above, second pilot valve 563 includes pilot port 543 which is in fluid communication with first conduit 539. Second pilot valve 563 is also in fluid communication with third pilot valve 565 via a second conduit 541. Second pilot valve 563 includes an exhaust port 545 which is open to atmosphere. Third pilot valve 565 is a normally open, three-way air pilot valve with a spring return generally well known to those having skill in the art. Third pilot valve 565 includes a pilot port 547 which is in fluid communication with a third conduit 549. Third pilot valve 565 is in fluid communication with rear air springs 24R (only one shown) via a fourth conduit 551, and also with height control valve 34 via a fifth conduit 553. First pilot valve 561 is a normally open, two-way air pilot valve with a spring return generally well known to those having skill in the relevant art. First pilot valve 561 includes a pilot port 555 which is in fluid communication with a sixth conduit 557. Sixth conduit 557 is in fluid communication with solenoid valve 62. First pilot valve 561 is in fluid communication with height control valve 34 via a seventh conduit 559, and with front air springs 24F (only one shown) of front axle/suspension system 10 via an eighth conduit 521. Solenoid valve 62 is in fluid communication with sixth conduit 557 and with a ninth conduit 523 which is in turn in fluid communication with pressure protection-height control valve conduit 537. First and third pilot valves 561,565 serve to isolate height control valve 34 from proportioning system 560 when solenoid valve 62 is energized.

Figure 6A:
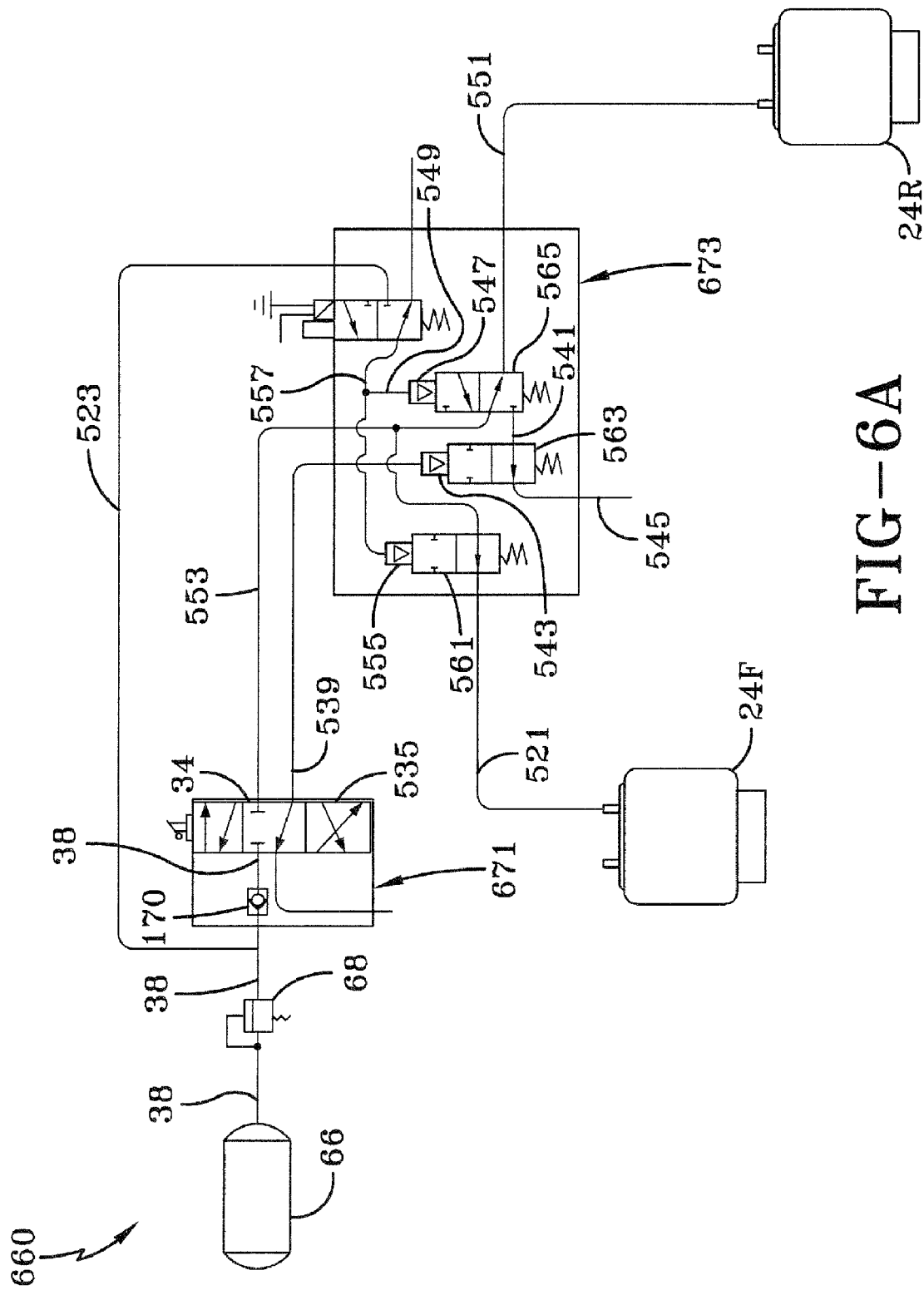
FIG. 6A is a schematic representation of an exemplary sixth embodiment pneumatic proportioning system of the present invention, showing the various components of the proportioning system in fluid communication with each other and with the air springs of the front and rear axle/suspension systems, for proportioning air among the air springs of the front and rear axle/suspension systems.

Turning now to FIG. 6A a schematic representation of an exemplary sixth embodiment pneumatic proportioning system for heavy-duty vehicle air springs of the present invention is shown, is indicated generally at 660, and will now be described. Because exemplary sixth embodiment pneumatic proportioning system 660 is similar to exemplary fifth embodiment pneumatic proportioning system 560 in many respects, only the differences between the two embodiments will be described immediately below.

The principle differences between exemplary sixth embodiment pneumatic proportioning system 660 and exemplary fifth embodiment pneumatic proportioning system 560 are that in the sixth embodiment, height control valve 34, second height control valve 535 and one-way check valve 170 are integrated with one another; and likewise, first, second and third pilot valves 561,563,565, second conduit 541, sixth conduit 557, third conduit 549, and solenoid valve 62 are also integrated with one another. More particularly, height control valve 34, second height control valve 535, and one-way check valve 170, are integrated into a first valve body 671. First, second, and third pilot valves 561,563,565, second conduit 541, sixth conduit 557, third conduit 549, and solenoid valve 62 are integrated into a second valve body 673. The remaining structure and arrangement of exemplary sixth embodiment pneumatic proportioning system 660 is generally identical to the structure of exemplary fifth embodiment pneumatic proportioning system 560 set forth above.

Figure 6B:
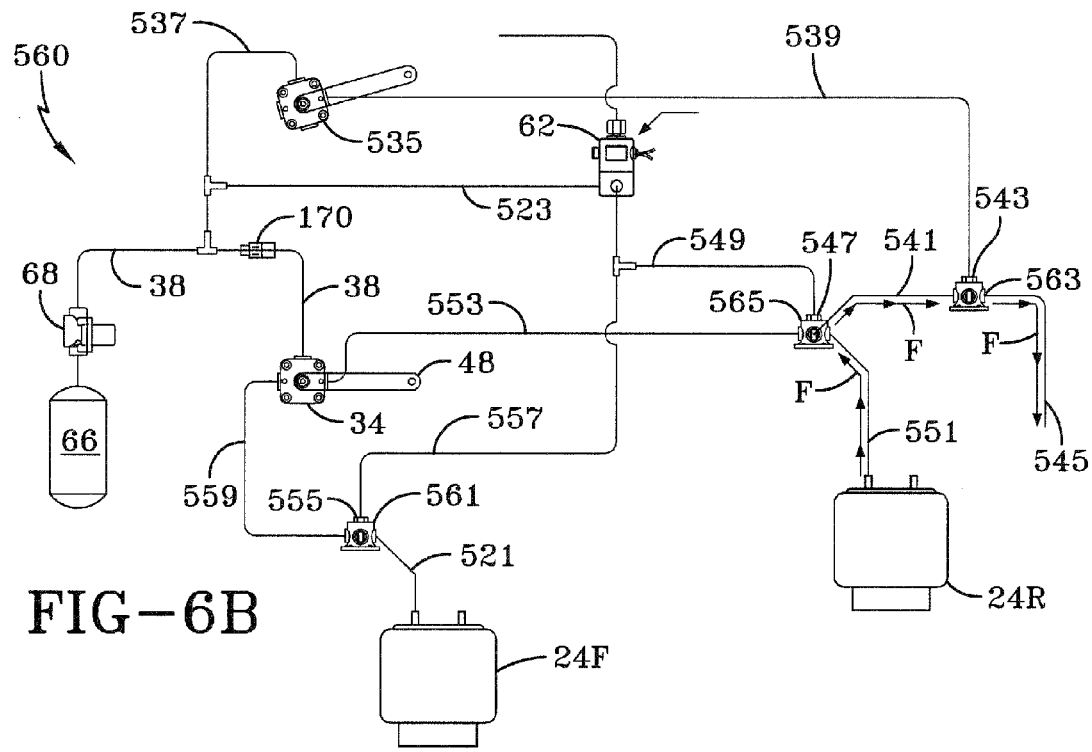
FIG. 6B is a schematic representation of the exemplary fifth embodiment pneumatic proportioning system shown in FIG. 6, depicting the proportioning of air between the front and rear air springs of the proportioning system when the designated minimum height for the second height control valve has not been reached.
Figure 6C:
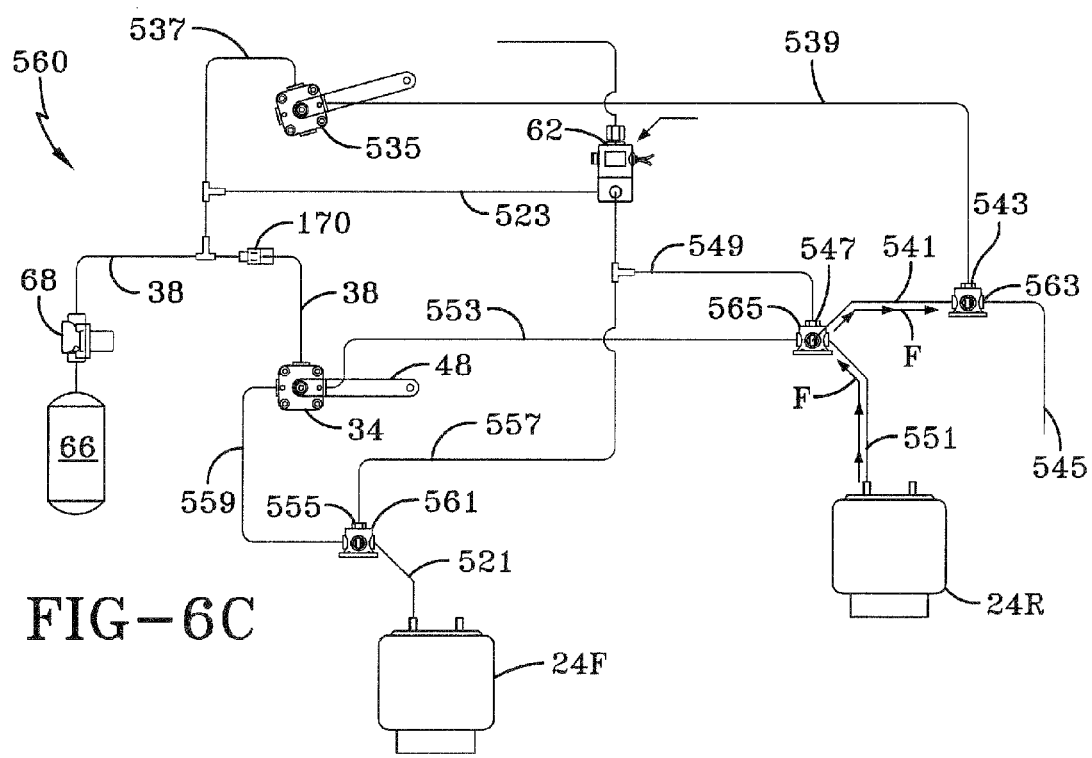
FIG. 6C is a schematic representation of the exemplary fifth embodiment pneumatic proportioning system shown in FIG. 6, depicting the proportioning of air between the front and rear air springs of the proportioning system when the designated minimum height for the second height control valve has been reached or exceeded.

Having now described the similar structures of exemplary fifth and sixth embodiment pneumatic proportioning systems 560,660, respectively, of the present invention, their operation on a loaded vehicle now will be described. Because the operation of fifth and sixth embodiment pneumatic proportioning systems 560,660 is generally identical, only the operation of fifth embodiment pneumatic proportioning system 560 is shown in FIGS. 6B and 6C and will be described immediately below, with the understanding that exemplary sixth embodiment pneumatic proportioning system 660 operates in generally the same manner. Fifth embodiment pneumatic proportioning system 560 is designed to proportion air between front and rear air springs 24F,R to transfer loads from the rear air springs to the front air springs in order to increase maneuverability of the heavy-duty vehicle and to minimize the likelihood of potentially overloading front axle/suspension system 10. Like first, second, third, and fourth exemplary embodiment pneumatic proportioning systems 160,260,360, 460, fifth embodiment pneumatic proportioning system 560, can be activated either by a switch, typically located in the cab of the vehicle, or by an automatic electronic control. When fifth embodiment pneumatic proportioning system 560 is activated in order to increase the maneuverability of the vehicle, solenoid valve 62 is energized and directs fluid from air reservoir 66 to pilot port 555 of first pilot valve 561 and also to pilot port 547 of third pilot valve 565, which isolates rear air springs 24R (only one shown) from height control valve 34 and allows air in the rear air springs to flow through fourth conduit 551, through third pilot valve 565, through second conduit 541 into second pilot valve 563, and out of exhaust port 545 to atmosphere, as shown by arrows F in FIG. 6B. This allows air from rear air springs 24R to be exhausted to atmosphere. As the air is exhausted from rear air springs 24R, cargo loads are transferred to the front air springs of front axle/suspension system 10. As the cargo loads are transferred to front air springs 24F, the height of the front air springs is decreased.

Because second height control valve 535 is set to direct air through first conduit 539 only when the jounce stops (not shown) of front air springs 24F of the vehicle have reached about 1.5 inches to about 0.25 inches from the mounting plate, air from rear air springs 24R (only one shown) will continue to exhaust in this manner, until front air springs 24F have lowered enough to reach or exceed the threshold, at which time the second height control valve will direct air through first conduit 539 to pilot port 543 of second pilot valve 563, which causes the second pilot valve to prevent exhaustion of air to atmosphere. In this manner, second height control valve 535 restricts exhaustion from rear air springs 24R (only one shown) once the height of the vehicle has lowered sufficiently to reach or exceed the 1.5 inch to 0.25 inch threshold of the second height control valve, as shown by arrows F in FIG. 6C, and prevents any further exhaustion of the rear air springs. This prevents rear air springs 24R from becoming completely exhausted which minimizes the potential that front axle/suspension system 10 will become overloaded and also minimizes the likelihood that jounce stop or bumper contact with the mounting bracket in the front and rear air springs will occur, which in turn increases lateral steer compliance of front and rear suspension assemblies 14, and also reduces trapping of the flexible member of the front and rear air springs. Once the height of front air springs 24F has raised above the threshold of second height control valve 535, and assuming that solenoid valve 62 is still energized, then air is once again directed from rear air springs 24R, through third pilot valve 565, into second pilot valve 563 and out of exhaust port 545 to atmosphere. If, when pneumatic proportioning system 560 is activated, the height of the vehicle is already positioned at or below the 1.5 inch to 0.25 inch threshold of second height control valve 535, then, as set forth above, no air from rear air springs 24R is permitted to exhaust to atmosphere. By proportioning the exhaustion of air from rear air springs 24R based upon vehicle height at front air spring 24F, pneumatic proportioning system 560 minimizes the likelihood of potentially overloading front axle/suspension system 10 and also minimizes the likelihood of jounce stop or bumper contact with the mounting bracket in both the front and rear air springs, thereby increasing lateral steer compliance of suspension assemblies 14, and reducing trapping of the flexible member of the rear air springs, both of which can lead to premature failure of the axle/suspension systems and their associated components.

Turning now to FIG. 7, an exemplary seventh embodiment pneumatic proportioning system for heavy-duty vehicle air springs of the present invention is schematically shown and is indicated generally at 760. The general appearance, arrangement, installation, and operation of pneumatic proportioning system 760 of the present invention is similar to that of fifth exemplary embodiment pneumatic proportioning system 560 shown in FIG. 6. Because exemplary seventh embodiment pneumatic proportioning system 760 is similar to exemplary fifth embodiment pneumatic proportioning system 560, only the differences between the two systems will be described immediately below. The principle difference between exemplary seventh embodiment pneumatic proportioning system 760 and exemplary fifth embodiment pneumatic proportioning system 560 is the inclusion of a pressure relief valve 761.

More particularly, exemplary seventh embodiment pneumatic proportioning system 760 of the present invention includes pressure relief valve 761, which is in fluid communication with eighth conduit 521 and with atmosphere. Pressure relief valve 761 has a pressure relief setting which is equivalent to the maximum pressure load rating of front air spring 24F. In this manner, pressure relief valve 761 prevents front air spring 24F from becoming over-pressurized during operation of pneumatic proportioning system 760. The remaining structure and arrangement of exemplary seventh embodiment pneumatic proportioning system 760 is generally identical to the structure of exemplary fifth embodiment pneumatic proportioning system 560 set forth above.

Turning now to FIG. 7A a schematic representation of an exemplary eighth embodiment pneumatic proportioning system for heavy-duty vehicle air springs of the present invention is shown, is indicated generally at 860, and will now be described. Because exemplary eighth embodiment pneumatic proportioning system 860 is similar to exemplary seventh embodiment pneumatic proportioning system 760 in many respects, only the differences between the two embodiments will be described immediately below.

The principle difference between exemplary eighth embodiment pneumatic proportioning system 860 and exemplary embodiment pneumatic proportioning system 760 is that in the eighth embodiment, height control valve 34, second height control valve 535 and one-way check valve 170 are integrated with one another; and likewise, first, second and third pilot valves 561,563,565, second conduit 541, sixth conduit 557, third conduit 549, solenoid valve 62, and pressure relief valve 761 are integrated with one another. More particularly, height control valve 34, second height control valve 535, and one-way check valve 170, are integrated into a first valve body 871. First, second, and third pilot valves 561,563,565, second conduit 541, sixth conduit 557, third conduit 549, solenoid valve 62 and relief valve 761 are integrated into a second valve body 873. The remaining structure and arrangement of exemplary eight embodiment pneumatic proportioning system 860 is generally identical to the structure of exemplary seventh embodiment pneumatic proportioning system 760 set forth above.

Having now described the similar structures of exemplary seventh and eighth embodiment pneumatic proportioning systems 760,860, respectively, of the present invention, their operation on a loaded vehicle now will be described. Because the operation of seventh and eighth embodiment pneumatic proportioning systems 760,860 is generally identical, only the operation of seventh embodiment pneumatic proportioning system 760 will be described immediately below, with the understanding that exemplary eighth embodiment pneumatic proportioning system 860 operates in generally the same manner. Seventh embodiment pneumatic proportioning system 760 is designed to proportion air between front and rear air springs 24F,R to transfer loads from the rear air springs to the front air springs in order to increase maneuverability of the heavy-duty vehicle and to minimize the likelihood of potentially overloading front axle/suspension system 10.

Seventh embodiment pneumatic proportioning system 760 of the present invention operates similarly to the operation of fifth and sixth embodiment pneumatic proportioning systems 560 and 660 set forth above. The difference being that because seventh embodiment pneumatic proportioning system 760 includes pressure relief valve 761, the air pressure in front air spring 24F will not exceed the air pressure relief setting of the pressure relief valve. More particularly, when the pressure in front air spring 24F exceeds the pressure relief setting of pressure relief valve 761, air from the front air springs is directed through eighth conduit 521, through the pressure relief valve and to atmosphere. By proportioning the exhaustion of air from rear air springs 24R based upon vehicle height, pneumatic proportioning system 760 minimizes the likelihood of potentially overloading front axle/suspension system 10 and also minimizes the likelihood of jounce stop or bumper contact with the mounting bracket in both the front and rear air springs, thereby increasing lateral steer compliance of suspension assemblies 14, and reducing trapping of the flexible member of the rear air springs, both of which can lead to premature failure of the axle/suspension systems and their associated components.

As can be seen from the detailed descriptions set forth above, pneumatic proportioning systems for heavy-duty vehicle air springs of the present invention 160,260,360,460, 560,660,760,860 overcome the deficiencies of prior art pneumatic control system 60 by pneumatically proportioning air between front and rear axle/suspension systems 10 during exhaustion of the rear axle/suspension system. More particularly, the proportioning is accomplished by utilizing pilot valve 182 (first and second embodiment pneumatic proportioning systems 160,260), proportioning relay valve 391 (third and fourth embodiment pneumatic proportioning systems 360,460), and second height control valve 535 (fifth, sixth, seventh and eighth embodiment pneumatic proportioning systems 560,660,760,860), to proportion air between front and rear air springs 24F,R of front and rear axle/suspension systems 10, respectively, of a loaded vehicle. By proportioning air between front air springs 24F and rear air springs 24R, rather than completely exhausting the rear air springs, which was typical to pneumatic control systems of the prior art such as pneumatic control system 60, the likelihood of potentially overloading front axle/suspension system 10 is minimized and contact between the jounce stops or bumpers of front and rear air springs and the upper bead plates of the air springs is also minimized. This decreases the likelihood that front and rear axle/suspension systems 10 and their associated components will prematurely fail because the maximum design threshold of the axle/suspension systems and their associated components has not been exceeded. Also, by minimizing contact between the jounce stops or bumpers of front and rear air springs 24F,R and the upper bead plate of the air springs, lateral steer compliance in suspension assemblies 14 is increased which helps minimize problems associated with the prior art where lateral steer compliance was reduced, such as increasing the lateral loads on the suspension assemblies during operation of the vehicle which can increase the likelihood of premature failure of the suspension assembly components. Also, by minimizing contact between the jounce stop or bumper and the upper bead plate of front and rear air springs 24F,R, trapping or collecting of the flexible member of the front and rear air springs at the top of the air spring piston (not shown) is reduced, which minimizes premature failure of the air spring. As is evident above, minimizing potential overload and jounce stop or bumper contact with the mounting plate maximizes vehicle and suspension assembly component life, reduces tire wear, and increases maneuverability of the vehicle, which ultimately reduces vehicle operating costs and improves vehicle safety for the fleet and/or the vehicle operator.

Of course other configurations and arrangements of the various components of the pneumatic proportioning system of the present invention will be evident to those having skill in the relevant art, without changing the overall concept of the invention. For example, the switch or electronic control that energizes solenoid valve 62 could also be connected to a sensor that is automatically activated based upon: suspension steer, suspension lateral displacement, turn signal activation, truck-to-trailer articulation angle, wheel rotation that converges or diverges across an axle or between axles, vehicle acceleration or deceleration, global positioning system based on position or tracking of the vehicle, vehicle speed, vehicle roll, and the like. Moreover, the various components of the pneumatic proportioning system of the present invention could be discrete components as shown in the first, third, and fifth preferred embodiments illustrated in FIGS. 4, 5, 6 and. 7, respectively, or one or more components could be integrated together, examples of which are shown in the second, fourth, and sixth embodiments shown in FIGS. 4A, 5A, 6A and 7A. Furthermore, the pneumatic proportioning system of the present invention could be utilized on heavy-duty vehicles having one, two or more air-ride axle/suspension systems without affecting the overall concept of the invention. Also, the pneumatic proportioning system of the present invention could be utilized on all types of leading and/or trailing arm beam-type designs and configurations known to those skilled in the art as well as on axle/suspension systems which use other than beam-type designs or configurations. For example, the present invention finds application in beams or arms that are made of materials other than steel, such as aluminum, other metals, metal alloys, composites, and/or combinations thereof. The present invention also finds application in beams or arms with different designs and/or configurations than that shown above, such as solid beams, shell-type beams, truss structures, intersecting plates, parallel plates, multiple-part beams, beams that are integrated with an axle, and/or beams that do not require traditional bushings and/or hangers. Also, the pneumatic proportioning system of the present invention could be utilized with more than one height control valve without affecting the overall concept of the present invention. In addition, the pneumatic proportioning system of the present invention could be configured such that only one, or more than one, of the air springs is proportioned when the system is activated. For example, first preferred embodiment pneumatic proportioning system 160 of the present invention proportions air between front and rear air springs 24F,R by proportioning exhaust air from the rear air spring when activated. However, either one or both of air springs 24 on any number of the axle/suspensions of the vehicle could he exhausted, such as only one of the rear air springs or one of the front air springs without affecting the overall concept of the present invention. Moreover, air springs 24 from separate axle/suspension systems could be exhausted simultaneously, such as the driver's side front air spring and the passenger's side rear air spring, or the passenger's side front air spring and the driver's side rear air spring, without affecting the overall concept of the present invention. In addition air springs from different sides of the same axle/suspension system could be proportioned with respect to one another without affecting the overall concept of the present invention. Moreover, for vehicles having multiple axles, load proportioning could be directed relative to any axle, or combination of axles, not just the front axle as was shown in preferred embodiments 160, 260,360,460,560,660,760,860. For example, a front tandem axle could be load proportioned with respect to the rear axle at higher speeds, without affecting the overall concept of the present invention. In addition, combinations of more than one of preferred embodiments 160,260,360,460,560,660760,860 could be used in conjunction with one another, also without affecting the overall concept of the present invention.

The present invention has been described with reference to a specific embodiment. It is to be understood that this illustration is by way of example and not by way of limitation. Potential modifications and alterations will occur to others upon a reading and understanding of this disclosure, and it is understood that the invention includes all such modifications and alterations and equivalents thereof.

Accordingly, the improved pneumatic proportioning system of the present invention is simplified, provides an effective, safe, inexpensive, and efficient pneumatic proportioning system which achieves all the enumerated objectives, provides for eliminating difficulties encountered with prior art pneumatic systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved pneumatic proportioning system is constructed, arranged and used, the characteristics of the construction and arrangement, and the advantageous, new and useful results obtained; the new and useful structures, devices, elements, arrangements, parts and combinations, and methods are set forth in the appended claims.

What is claimed is:

1. A pneumatic proportioning system for heavy-duty vehicle air springs comprising:
   a) heavy-duty vehicle first and second non-steerable non-drive axles, and a third axle;
   b) an air supply;
   c) at least a first air spring and a second air spring, said first and second air springs being in fluid communication with said air supply and being used in conjunction with said first axle and said second axle;
   d) a first height control valve being in fluid communication with said air supply and with said first and second air springs;
   e) a solenoid valve being in fluid communication with said height control valve and with said second air spring, said solenoid valve exhausting air from the second air spring when the solenoid valve is activated;
   f) proportioning means being in fluid communication with at least said solenoid valve, said first air spring, and atmosphere, for limiting said exhausting of said air from said second air spring based upon a condition of said first air spring, adapted to proportion loads between said first air spring and said second air spring, in order to increase maneuverability of said heavy-duty vehicle or to increase life of certain components of the heavy-duty vehicle.

2. The pneumatic proportioning system of claim 1, whereby said proportioning means is a proportioning relay valve further comprising a control port being in fluid communication with said first air spring, a supply port being in fluid communication with said air supply, a delivery port being in fluid communication with said second air spring, and an exhaust port in fluid communication with atmosphere.

3. The pneumatic proportioning system of claim 2, wherein said proportioning relay valve and said solenoid valve are integrally formed with one another.

4. The pneumatic proportioning system of claim 1, further comprising a one-way check valve being in fluid communication with said air supply and said height control valve.

* * * * *